United States Patent
Paladugu et al.

(10) Patent No.: US 11,737,001 B2
(45) Date of Patent: Aug. 22, 2023

(54) LAYER 2 RELAY USER EQUIPMENT MOBILITY

(71) Applicant: QUALCOMM Incorporated, San Diego, CA (US)

(72) Inventors: Karthika Paladugu, San Diego, CA (US); Hong Cheng, Basking Ridge, NJ (US); Gavin Bernard Horn, La Jolla, CA (US); Ozcan Ozturk, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 145 days.

(21) Appl. No.: 17/303,213

(22) Filed: May 24, 2021

(65) Prior Publication Data

US 2021/0385714 A1 Dec. 9, 2021

Related U.S. Application Data

(60) Provisional application No. 63/036,849, filed on Jun. 9, 2020.

(51) Int. Cl.
*H04W 36/08* (2009.01)
*H04W 36/30* (2009.01)
(Continued)

(52) U.S. Cl.
CPC .......... *H04W 36/08* (2013.01); *H04W 36/30* (2013.01); *H04W 36/38* (2013.01); *H04W 88/04* (2013.01)

(58) Field of Classification Search
CPC ................................................... H04W 88/04
See application file for complete search history.

(56) References Cited

U.S. PATENT DOCUMENTS

2018/0279188 A1  9/2018 Tenny et al.
2021/0306914 A1* 9/2021 Kanamarlapudi ........................... H04W 36/0033

(Continued)

OTHER PUBLICATIONS

Huawei, et al., "Key Points on IAB Enhancements", 3GPP TSG RAN Meeting #86, 3GPP Draft, RP-192795, 3rd Generation Partnership Project (3GPP), Mobile Competence Centre, 650, Route Des Lucioles, F-06921 Sophia-Antipolis Cedex, France, vol. TSG RAN, No. Sitges, Spain, Dec. 9, 2019-Dec. 12, 2019, 2 Pages, Dec. 2, 2019 (Dec. 2, 2019), XP051834387, Retrieved from the Internet: URL: https://ftp.3gpp.org/tsg_ran/TSG_RAN/TSGR_86/Docs/RP-192795.zip RP-192795 Key points on IAB enhancements.docx retrieved on Dec. 2, 2019] section 2.3.

(Continued)

*Primary Examiner* — Pao Sinkantarakorn
*Assistant Examiner* — Kabir U Jahangir
(74) *Attorney, Agent, or Firm* — Arent Fox, LLP/Qualcomm

(57) ABSTRACT

The present disclosure provides systems, devices, apparatus and methods, including computer programs encoded on storage media, for layer 2 relay user equipment (UE) mobility. A relay UE relays data between a first network entity and a remote UE based on a first configuration of the remote UE. The relay UE may receive, from the first network entity on a first connection, a handover request that includes a second configuration for a second network entity or a third configuration for the remote UE. The relay UE determines whether dual active protocol stack radio link control channels are configured for the remote UE based on the first configuration or the third configuration. The relay UE establishes a second connection with the second network entity based on the second configuration, and transmits, to the remote UE, a handover status indicating a result of estab- (Continued)

lishing the second connection with the second network entity.

16 Claims, 21 Drawing Sheets

(51) Int. Cl.
*H04W 36/38* (2009.01)
*H04W 88/04* (2009.01)

(56) References Cited

U.S. PATENT DOCUMENTS

2022/0386204 A1* 12/2022 Parichehrehteroujeni ................... H04W 74/0833
2023/0083266 A1* 3/2023 Wu ................... H04W 36/0069

OTHER PUBLICATIONS

Partial International Search Report—PCT/US2021/034065—ISA/EPO—dated Sep. 16, 2021.
International Search Report and Written Opinion dated Nov. 9, 2021 from corresponding PCT Application No. PCT/US2021/034065.

\* cited by examiner

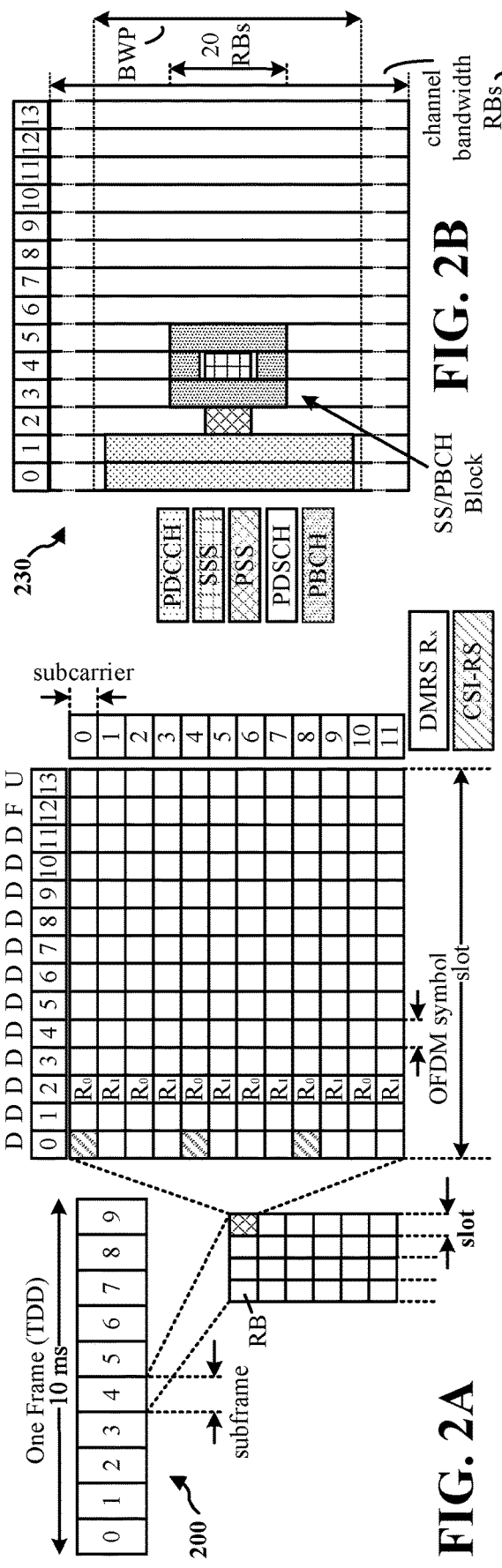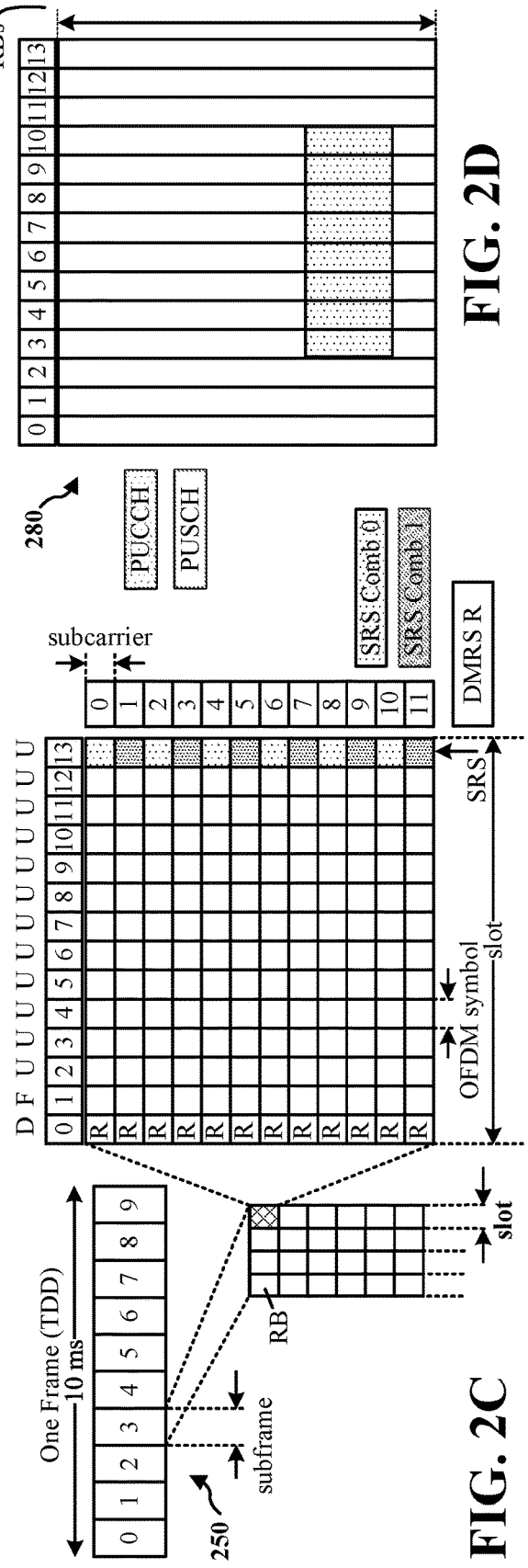

LAYER 2 RELAY USER EQUIPMENT MOBILITY

CROSS REFERENCE TO RELATED APPLICATION(S)

This application claims the benefit of U.S. Provisional Patent Application Ser. No. 63/036,849, entitled "LAYER 2 RELAY USER EQUIPMENT MOBILITY," filed on Jun. 9, 2020, which is expressly incorporated by reference herein in its entirety.

BACKGROUND

Technical Field

The present disclosure relates generally to communication systems, and more particularly, to wireless communication involving relaying between user equipment (UEs).

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided for wireless communication at a first user equipment (UE). The apparatus relays data between a first base station and at least one second UE based on a first configuration of the at least one second UE. The apparatus receives, from the first base station on a first connection, a handover request that includes one or more of a second configuration for a second base station or a third configuration for the at least one remote UE. The apparatus determines whether one or more dual active protocol stack (DAPS) radio link control (RLC) channels are configured for the second UE based on the first configuration or the third configuration. The apparatus establishes a second connection with the second base station based at least in part on the second configuration. The apparatus transmits a handover status indication indicating a result of establishing the second connection with the second base station to the at least one second UE.

In an aspect of the disclosure, a method, a computer-readable medium, and an apparatus are provided for wireless communication at a first UE. The apparatus communicates data with a first base station on a first connection through a second UE. The apparatus receives a first configuration for establishing one or more DAPS RLC channels on the first base station. The apparatus receives a handover message that includes a second configuration for connecting the first UE to a second base station. The apparatus establishes a connection with the second base station based at least in part on the second configuration.

In an aspect of the disclosure, a method, a computer-readable medium, and an apparatus are provided for wireless communication at a first base station. The apparatus transmits data to and receives data from a first UE through a second UE. The apparatus establishes one or more DAPS RLC channels with the first UE. The apparatus initiates a handover procedure to move the first UE and the second UE to a second base station. The apparatus transmits a group handover request to the second UE or transmits an individual handover request to each of the first UE and the second UE.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 2A, 2B, 2C, and 2D are diagrams illustrating examples of a first 5G/NR frame, DL channels within a 5G/NR subframe, a second 5G/NR frame, and UL channels within a 5G/NR subframe, respectively according to some aspects.

DETAILED DESCRIPTION

Figure 1:
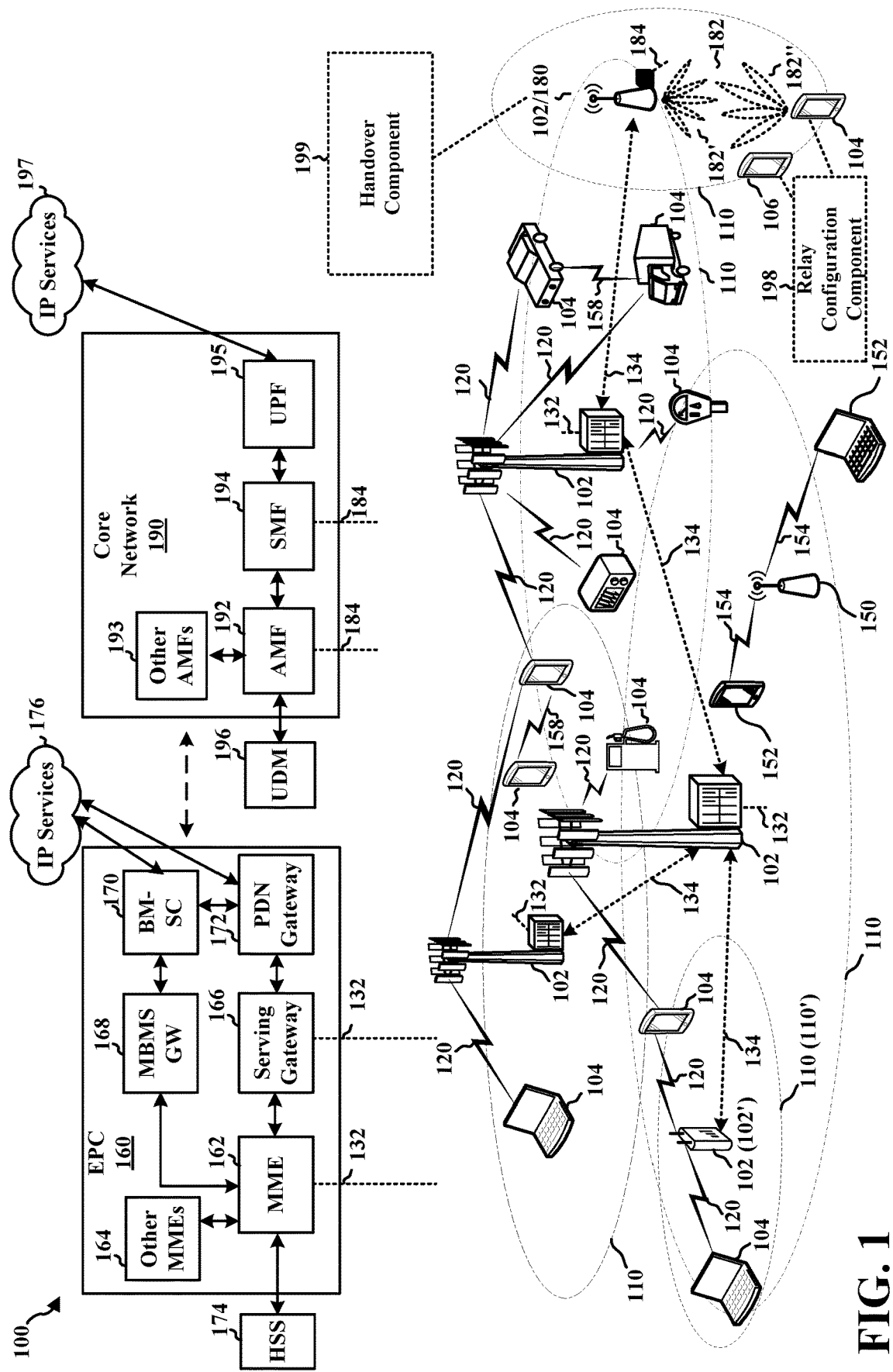
FIG. 1 is a diagram illustrating an example of a wireless communications system and an access network according to some aspects.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

Techniques discussed herein generally relate to communication scenarios involving data relaying and/or dual active protocol stack handover. Aspects presented herein may improve the efficiency and performance of a handover procedure by configuring a relay UE or a remote UE to utilize dual active protocol stack dedicated radio bearers. Additionally and/or alternatively, aspects presented herein may enable a relay device to handle handover failure with dual active protocol stack dedicated radio bearers configured for a remote device.

FIG. 1 is a diagram illustrating an example of a wireless communications system and an access network 100. In certain aspects, the UE 104 (e.g., a remote UE) and the UE 106 (e.g., a relay UE) may include a relay configuration component 198 configured to handle data transmission during a handover procedure, such as relaying data transmission for DAPS RLC channels and non-DAPS RLC during a handover procedure and/or suspending connection between the UE 104 and the UE 106. In certain aspects, the base station may include a handover component 199 configured to initiate the handover procedure to move the UE 104 and the UE 106 to another base station. For example, the handover component 199 may receive one or more measurement report from the UE 104 and/or UE 106, and may determine whether to initiate a handover procedure based at least in part on the measurement report. The handover component 199 may enable the base station continue to receive data from the UE 104 through DAPS RLC channels while the UE 106 is moving to another base station.

Network entities, such as base stations 102 configured for 4G LTE (collectively referred to as Evolved Universal Mobile Telecommunications System (UMTS) Terrestrial Radio Access Network (E-UTRAN)), may interface with the EPC 160 through first backhaul links 132 (e.g., S1 interface). Other network entities, such as base stations 102 configured for 5G NR (collectively referred to as Next Generation RAN (NG-RAN)), may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include and/or be referred to as an eNB, gNodeB (gNB), or another type of base station. Some network entities, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Frequency range bands include frequency range 1 (FR1), which includes frequency bands below 7.225 GHz, and frequency range 2 (FR2), which includes frequency bands above 24.250 GHz. Communications using the mmW/near mmW radio frequency (RF) band (e.g., 3 GHz-300 GHz) has extremely high path loss and a short range. Base stations/UEs may operate within one or more frequency range bands. The mmW base station 180 may utilize beamforming 182 with the UE 104 to compensate for the extremely high path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The network entity may include and/or be referred to as a base station, a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and F is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies 0 to 4 allow for 1, 2, 4, 8, and 16 slots, respectively, per subframe. For slot configuration 1, different numerologies 0 to 2 allow for 2, 4, and 8 slots, respectively, per subframe. Accordingly, for slot configuration 0 and numerology μ, there are 14 symbols/slot and $2^\mu$ slots/subframe. The subcarrier spacing and symbol length/duration are a function of the numerology. The subcarrier spacing may be equal to $2^\mu * 15$ kHz, where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of slot configuration 0 with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100× is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A PDCCH within one BWP may be referred to as a control resource set (CORESET). Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARD) ACK/NACK feedback. The PUSCH carries data, and may additionally be used to carry a buffer status report (BSR), a power headroom report (PHR), and/or UCI.

Figure 3:
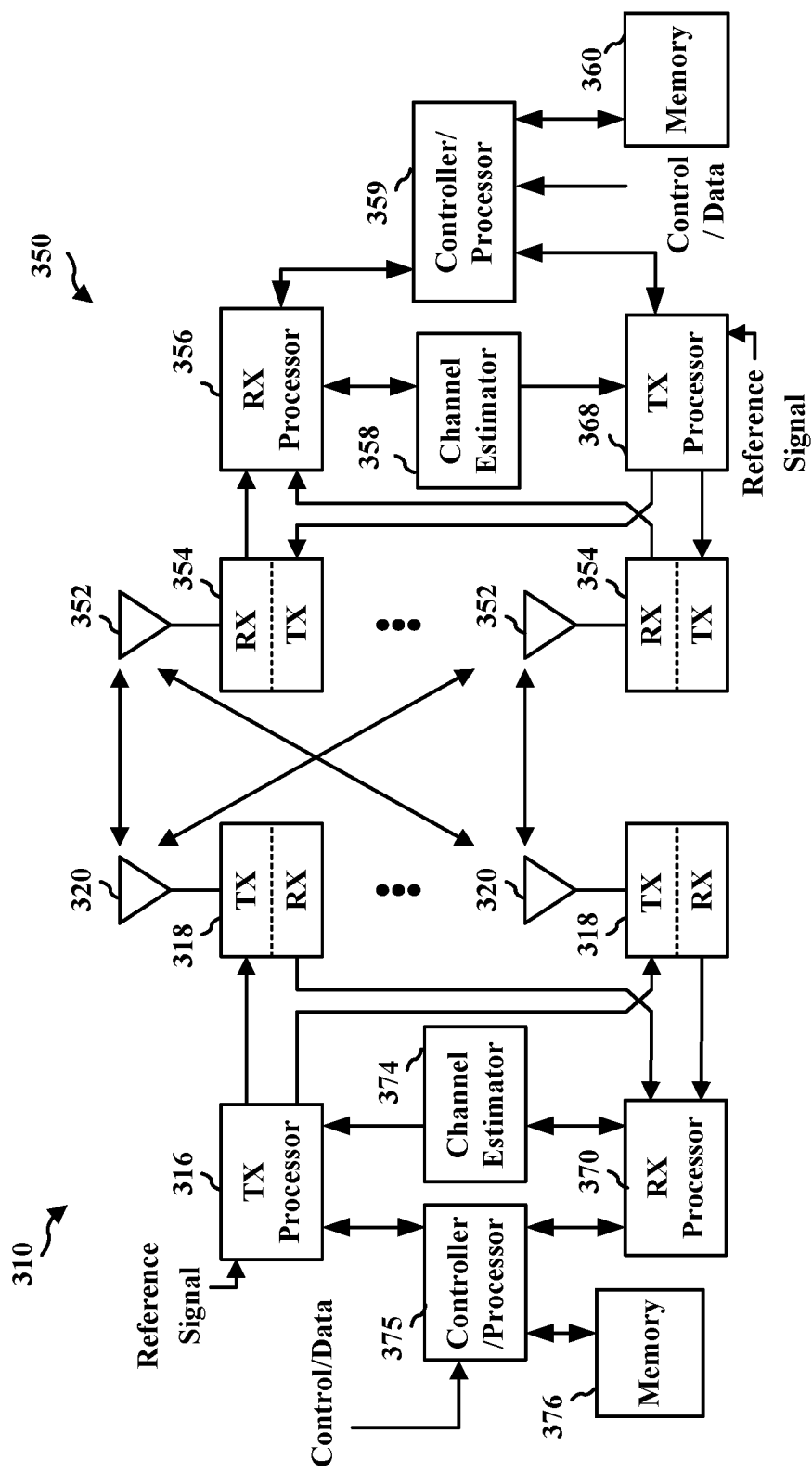
FIG. 3 is a diagram illustrating an example of a base station and user equipment (UE) in an access network according to some aspects.

FIG. 3 is a block diagram of a network entity 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the network entity 310. These soft decisions may be based on channel estimates computed by the channel estimator 358. The soft decisions are then decoded and deinterleaved to recover the data and control signals that were originally transmitted by the network entity 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the network entity 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the network entity 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the network entity 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with 198 of FIG. 1.

At least one of the TX processor 316, the RX processor 370, and the controller/processor 375 may be configured to perform aspects in connection with 199 of FIG. 1.

Figure 4:
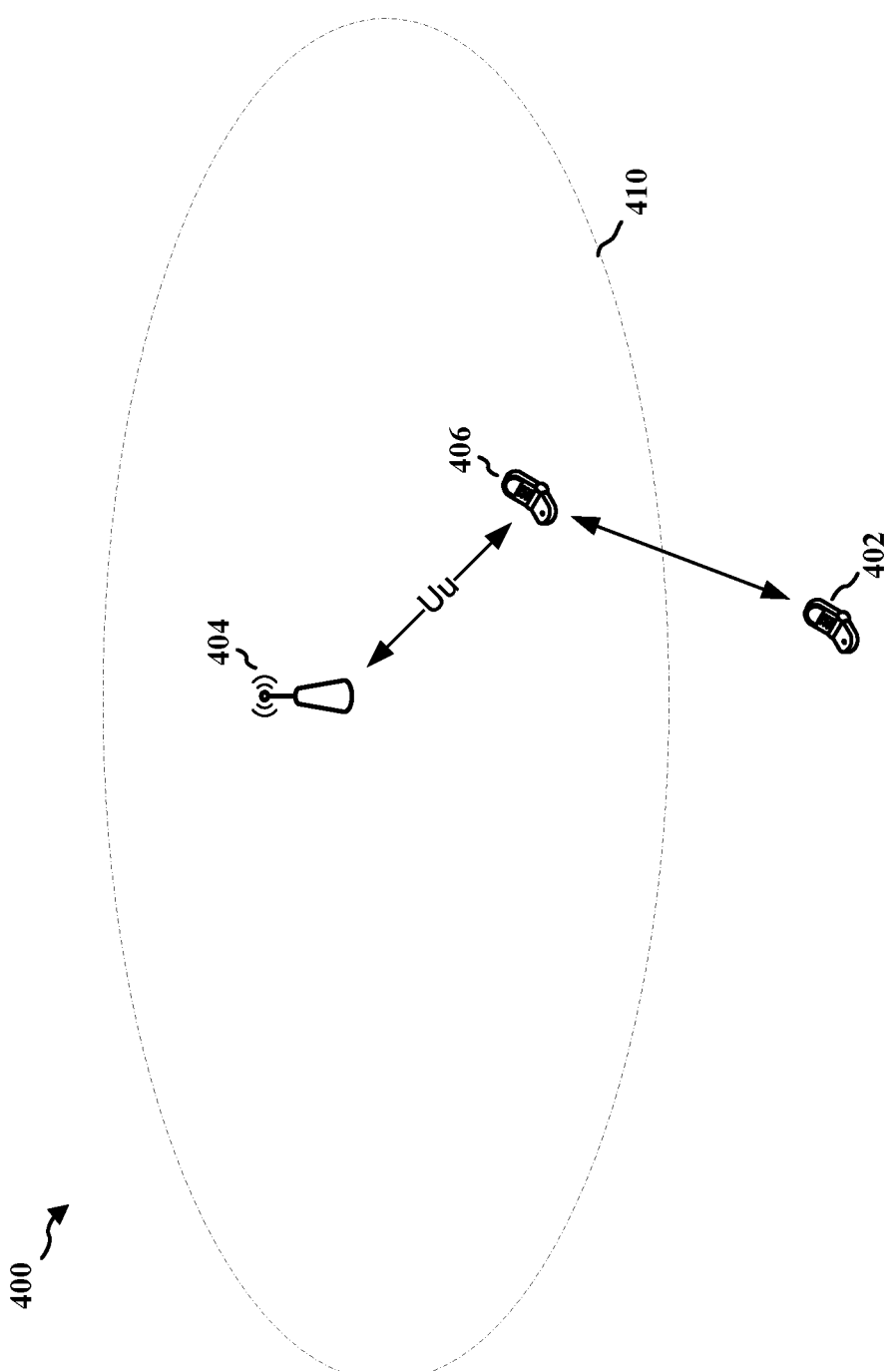
FIG. 4 is a diagram illustrating an example of wireless relaying.

FIG. 4 is a diagram 400 illustrating an example of wireless relaying between a remote UE 402 and a network entity 404. The network entity 404 may provide communication coverage for a geographic coverage area 410. As shown by the figure, the remote UE 402 and a relay UE 406 may be within the coverage area 410 of a network entity 404. The remote UE 402 may request relay services from the relay UE 406 when the remote UE 402 is unable to establish a direct connection with the network entity 404 or the direct connection with the network entity 404 is degraded. For example, there may be atmospheric and environmental interference between the remote UE 402 and the network entity 404 where the remote UE 402 may need to transmit or receive data through the relay UE 406.

A relay UE (e.g., 406) may monitor for relay requests from other UEs (e.g., 402). For example, the relay UE may be configured to listen for/attempt to detect relay request(s) from nearby UE(s) during monitoring occasions. In some examples, to enable identification, the relay UE may announce its presence by transmitting sidelink discovery messages periodically, and/or the remote UE may announce sidelink relay solicitation messages periodically. The message, which indicates a request for a relay to the network entity, may be referred to as a relay request, a relay solicitation, or other name. The sidelink discovery message may indicate the relay UE's capability to act as a relay and/or may indicate the relay UE's sidelink communication capabilities. During this process, the remote UE may obtain the UE ID of the relay UE to be used for sidelink transmission and/or reception of the relayed traffic. In some examples, the indication of the relay UE's presence as a potential relay may be sent after the remote UE's request for a relay. The relay UE may indicate its availability to operate as a relay between the remote UE and the network entity in response to receiving the request from the remote UE. The message may be a broadcast indication that is broadcast over sidelink or may be a unicast message that is transmitted to the remote UE over sidelink.

After the transmission of the discovery message or the receipt of the relay solicitation, a direct communication (e.g., PC5 connection) may be established between the relay UE and the remote UE. The remote UE may also communicate with the relay UE to perform a mutual authentication (e.g., direct security mode) procedure. In some examples, PC5 signaling protocol may be used for direct connection management functions such as direct link setup/release, security parameter control, and IP address allocation. In some examples, the remote UE and the relay UE may negotiate for the relaying of communication between the remote UE and the network entity.

After the remote UE and the relay UE have discovered each other, the remote UE may be configured to send a message indicating to the network entity informing the network entity (e.g., 404) about the potential relay UE. The message may indicate the presence and/or the availability of the relay UE. The remote UE 402 may send a report informing the detected relay UE and/or a sidelink measurement report for the relay UE to the network entity. The sidelink measurement report may correspond to a measured channel quality (e.g., sidelink-reference signal receive power (RSRP)) between the remote UE and the relay UE.

The sidelink measurement report may also include explicit or implicit relay UE identifier. Based on the message and/or the sidelink measurement report, the network entity may perform relay UE selection to determine whether the relay UE has met the threshold for being a relay and/or whether the relay UE is a suitable or best candidate for relay as there may be multiple candidates (e.g., multiple relay UEs). The network entity may determine whether the relay UE qualifies to provide relay services and/or select the relay UE to provide relay services based on an RSRP measurement.

Figure 5:
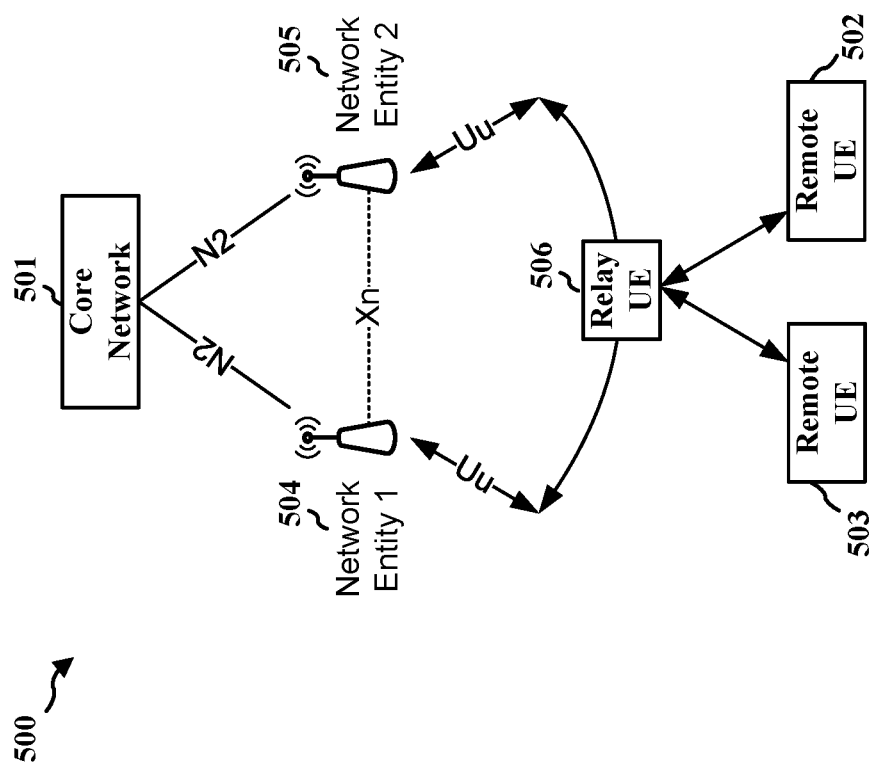
FIG. 5 is a diagram illustrating an example of wireless relaying.

FIG. 5 is a diagram 500 illustrating an example of wireless relaying between a relay UE 506 and remote UEs 502, 503 and network entities 504, 505. The remote UE 502 and the remote UE 503 may be connected to the relay UE 506, such as via a PC5 interface or a sidelink. The relay UE 506 may be connected to a network entity 504 or 505 (e.g., gNB) via a Uu interface and the network entities 504 and 505 may be connected to a core network 501 (e.g., 5G Core Network) via a N2 interface. The term "radio access" may be used to refer to the Uu interface. The network entities (e.g., 504 and 505) may also communicate with each other using an Xn interface. Thus, the remote UE 502 and the remote UE 503 may have access to the core network 501 through the relay UE 506. For example, the remote UE 502 may send a data to the core network 501 by first transmitting the data to the relay UE 506 via a PC5 interface, and the relay UE 506 may forward the data to the network entity 504 via a Uu interface. The network entity 504 may then send the data to the core network 501 via the N2 link. Similarly, the remote UE 503 may receive a data from the core network 501, where the core network 501 may first forward the data to the relay UE 506 through the network entity 504 and/or 505, and the relay UE 506 may then forward the data to the remote UE 503, etc.

Figure 6:
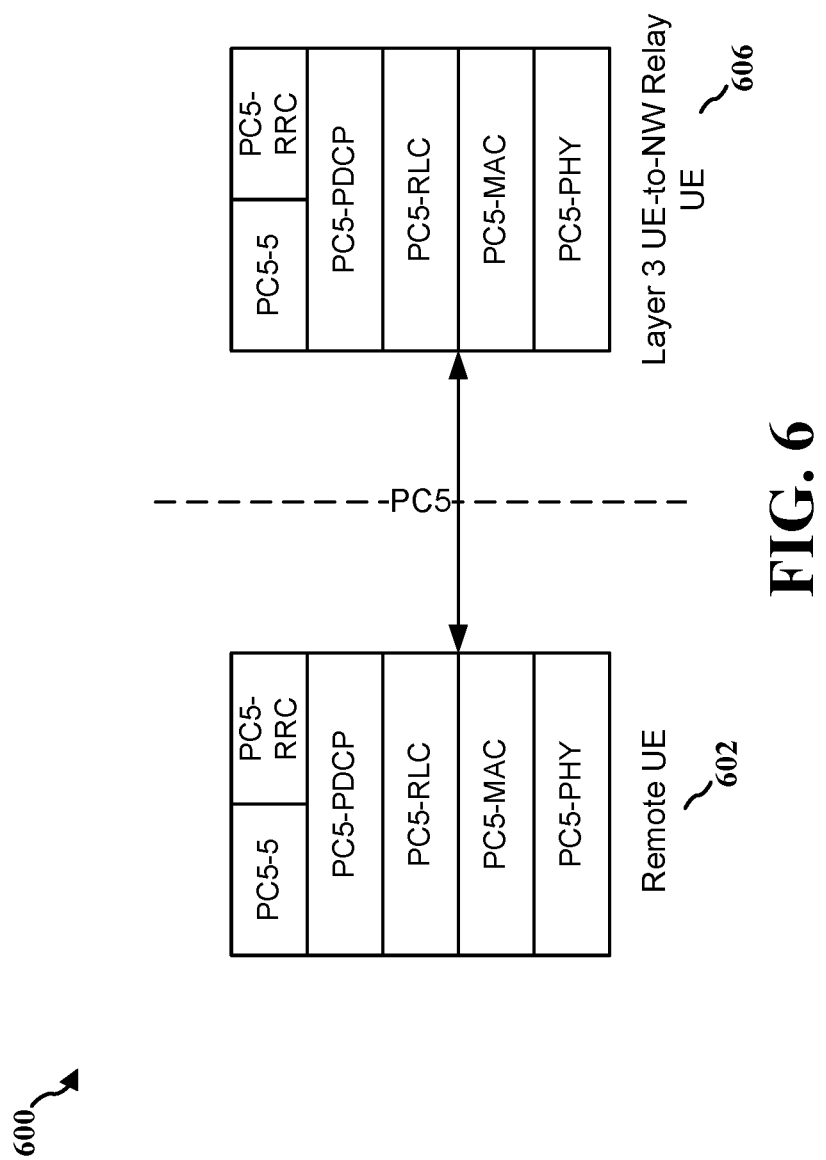
FIG. 6 is a diagram illustrating an example control plane protocol stack for a L3 UE-to-network relay.

There may be one or more type of architecture, implementation and/or design for the relay UE (e.g., 106, 406, 506), such as a layer 2 (L2) relay and/or a layer 3 (L3) relay, etc. FIG. 6 is a diagram 600 illustrating an example control plane protocol stack for a L3 UE-to-network (NW) relay. For the L3 relay, a remote UE 602 may connect to the relay UE 606 through a PC5 interface, where the control plane in the PC5 interface may include one or more of RRC, PDCP, RLC, MAC sublayers, and the physical layer. A PC5 unicast link may be setup for the relay UE 606 to serve the remote UE 602. In some examples, the remote UE may not have a Uu access stratum (AS) connection with a radio access network (RAN) over the relay path, and may not have a direct non-access stratum (NAS) connection with a core network (e.g., 5G Core Network). Thus, the remote UE 602 may not be visible to the core network. However, the remote UE 602 may report its presence to the core network by relay (e.g., through relay UE 606). The remote UE 602 may also make itself visible to the core network through a Non-3GPP Interworking (N3IWF).

Figure 7:
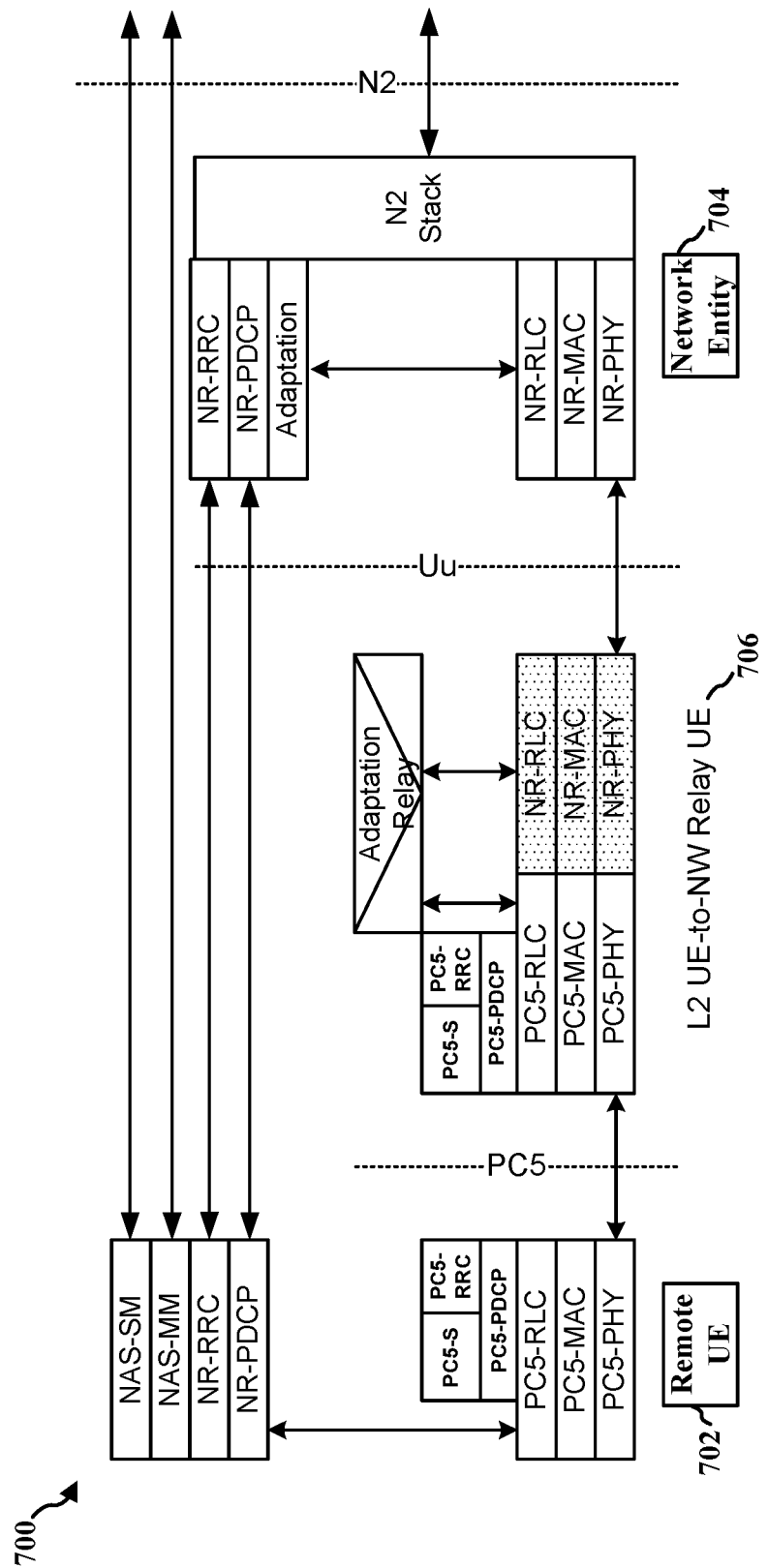
FIG. 7 is a diagram illustrating an example control plane protocol stack for a L2 UE-to-network relay.

FIG. 7 is a diagram 700 illustrating an example control plane protocol stack for a L2 UE-to-NW relay. The remote UE 706 may include a PC5 control plane (e.g., interface) and a Uu control plane. The PC5 control plane may be used for setting up a PC5 unicast link between the remote UE 702 and the relay UE 706 prior to relaying. The remote UE 702 may support Uu AS and NAS connections (e.g., above PC5 RLC), where a RAN may control the remote UE's PC5 link via an RRC. For example, the NAS and AS messages, such as RRC signaling messages or messages generated by the remote UE 702, may be sent to the PC5 layer and go through the relay UE 706. The control plane protocol stack may include an adaptation layer to support multiplexing multiple UEs' traffic on the relay UE's Uu link. For example, the adaptation layer of the relay UE 706 may handle and identify data packets that are to be sent or relayed to the network entity 704.

Figure 8:
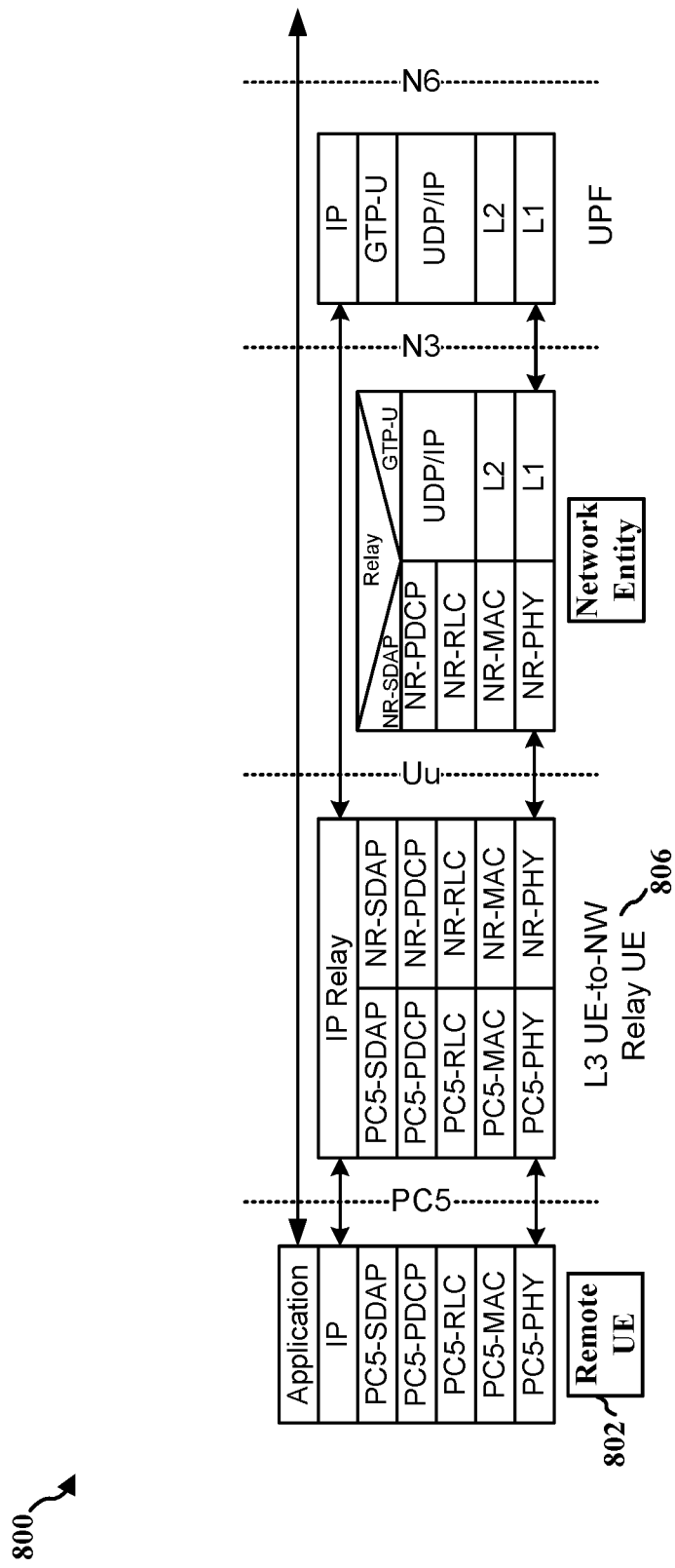
FIG. 8 is a diagram illustrating an example user plane protocol stack for a L3 UE-to-network relay.

FIG. 8 is a diagram 800 illustrating an example user plane protocol stack for a L3 UE-to-NW relay. The L3 relay may serve as an IP router, where a relay UE 806 may forward a remote UE 802's traffic to a core network using its packet data unit (PDU) session. Under L3 relay, local routings such as between the remote UE 802 and the relay UE 806, or between two remote UEs may be possible. Non-IP traffic may be supported in L3 relay by encapsulation in IP, or by dedicated PDU session per remote UE.

Figure 9:
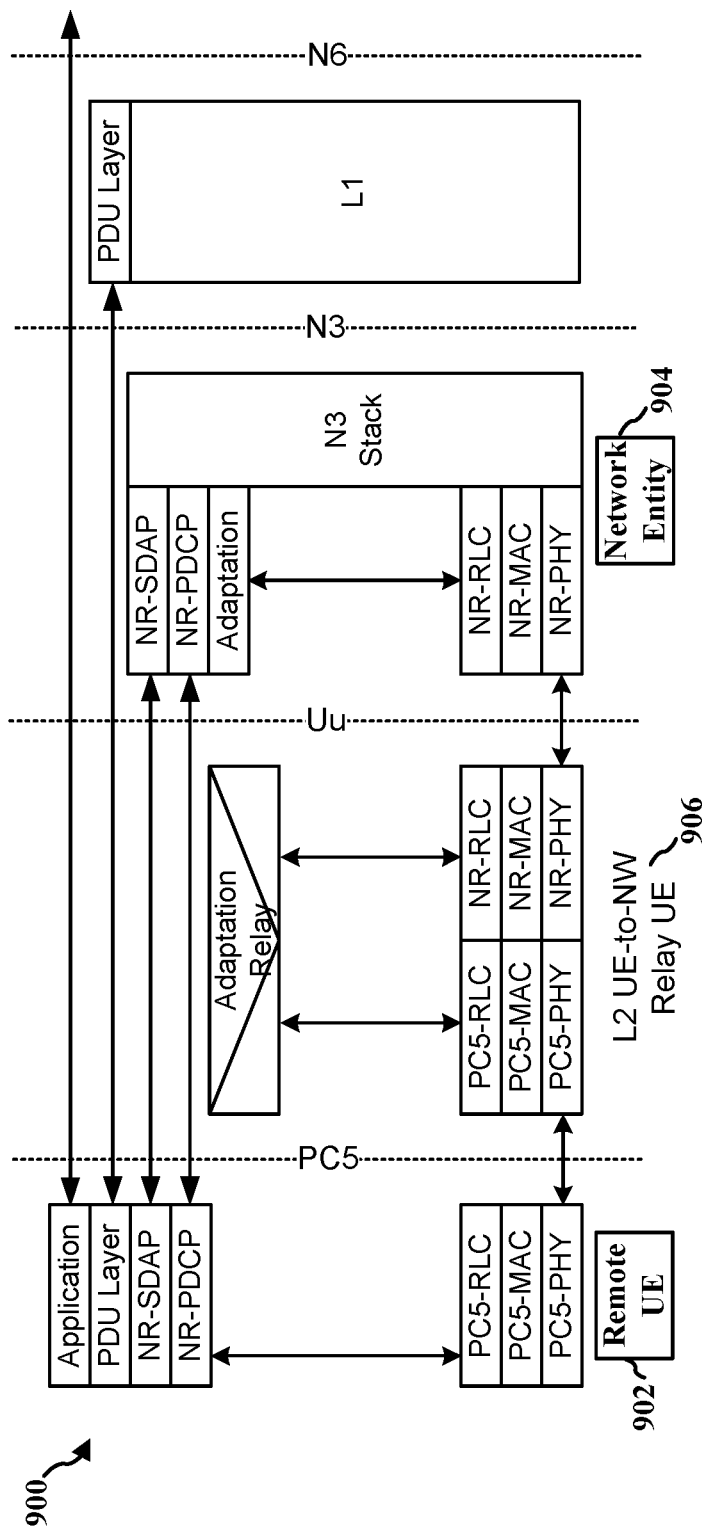
FIG. 9 is a diagram illustrating an example user plane protocol stack for a L2 UE-to-network relay.

FIG. 9 is a diagram 900 illustrating an example user plane protocol stack for a L2 UE-to-NW relay. An L2 relay UE 906 may perform the relay below the Packet Data Convergence Protocol (PDCP). The relay UE 906 may forward the PC5 bearer and the Uu bearer using an adaptation layer function. A remote UE 906's dedicated radio bearers (DRBs) may be controlled by the network entity 904. All traffic from the remote UE 902 may terminate at the core network, and there may be no direct communication between remote UEs, or to the relay UE 906.

Figure 10:
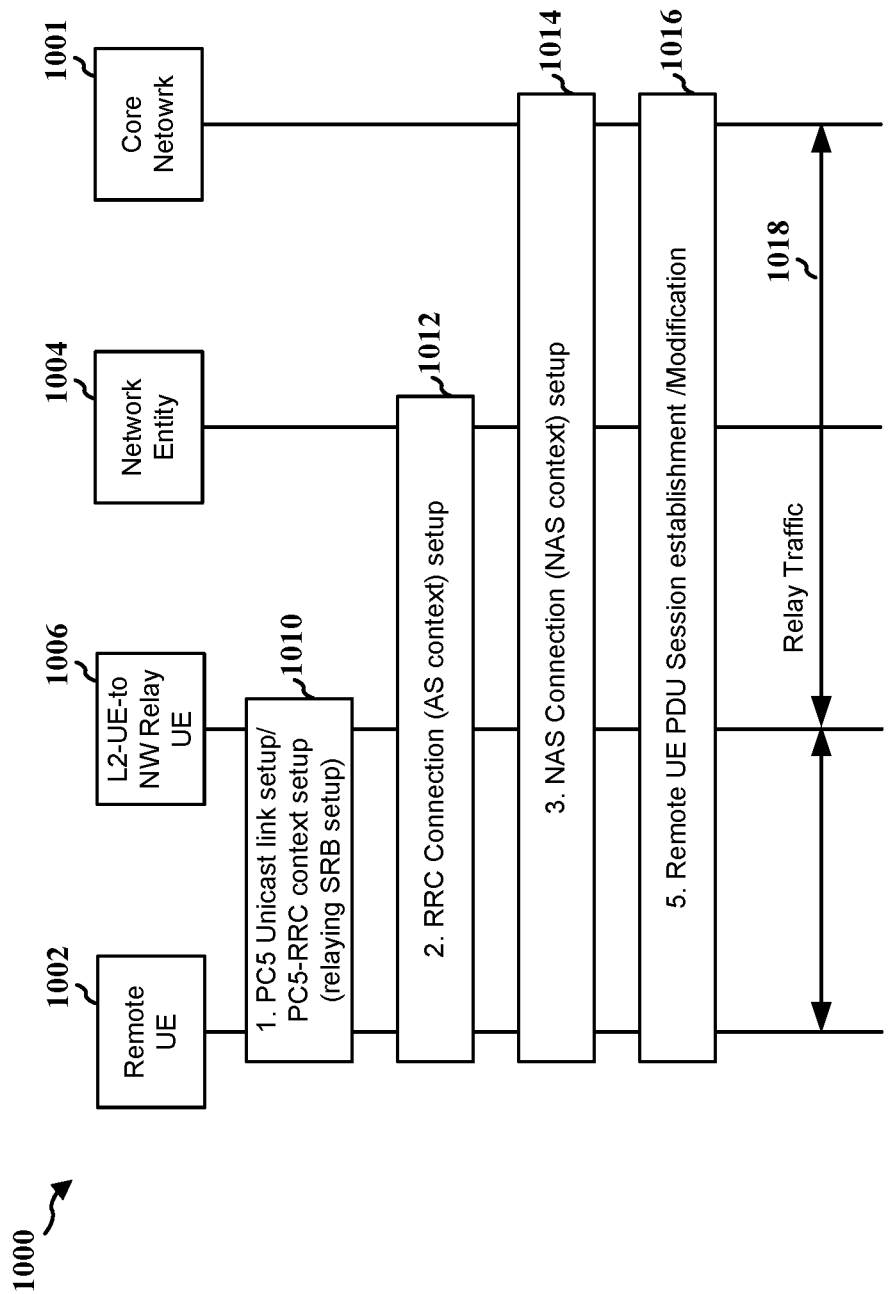
FIG. 10 is a diagram illustrating an example communication flow.

FIG. 10 is a diagram 1000 illustrating an example communication flow for an L2 UE-to-NW relay procedure. At a start, a remote UE 1002 may discover a relay UE 1006 using the relay discovery procedures, such as described in connection with FIG. 4. At 1010, after discovery, the remote UE 1002 and the relay UE 1006 may establish a PC5 unicast link before initiating the relaying. The remote UE 1002 and/or the relay UE 1006 may use the PC5 signaling protocol stack (e.g., PC5-S signaling) to derive security keys and establish security for the PC5 link. The remote UE 1002 and the relay UE 1006 may also establish bearers for relaying control plane and user plane traffic over the PC5 and Uu links. At 1012 and 1014, the remote UE 1002 may establish an RRC connection (e.g., AS context) and a NAS connection (e.g., NAS context) and security context with the network entity 1004 and the core network 1001 over the relay connection. At 1016, the remote UE 1002 may establish PDU sessions with the core network 1001 to route user traffic via the relay UE 1006 to the network. At 1018, the remote UE 1002 may communicate with the core network 1001 through the relay UE 1006.

In some examples, in the case of an L3 relay, the data forwarding may be designed to happen at an IP layer, such as described in connection with FIGS. 6 and 8. However, after the remote UE (e.g., 502, 503, 602, 802) forwards the data to the relay UE (e.g., 506, 606, 806), the relay UE may forward the data at L2 instead, where the architecture of the remote UE may maintain a NAS connection with the core network and the network entity. Thus, the remote UE may be known to the network (e.g., the network entity and core network) even though it is behind the relay UE, and the remote UE may communicate with the network as if the remote UE is connected directly to the network.

While a relay UE is connected to a network entity, the channel condition between the relay UE and the network entity (e.g., source base station) may change, such as when there is a blockage between them, or when the remote UE is moving away from the source network entity, etc. The relay UE may switch its connection with the source network entity to another network entity (e.g., a target base station). For example, referring back to FIG. 5, the relay UE 506 may have connected to the core network 501 through the source network entity 504 in the first place. When the relay UE 506 is moving toward the target network entity 505 and away from the source network entity 504, the relay UE 506 may switch its connection to the target network entity 505, such as when the connection between UE 506 and the network entity 504 deteriorates. To trigger the relay UE mobility (e.g., switching connection from one network entity to another), the relay UE may report channel conditions (e.g., Uu measurements) to the source network entity at certain time interval or under certain conditions, and the source network entity may decide whether or when to handover the relay UE to another network entity based at least in part on the channel condition reports.

When a relay UE, such as a L2 relay UE, is being handed over from a source network entity to a target network entity and the relay UE is also connected to remote UE(s)(s), the serving network entity or the relay UE may decide whether the relay UE may continue to relay data for the remote UE(s) at the target network entity (e.g., the relay UE brings the remote UE(s) to the target base station). For example, the remote UE(s) may have maintained a NAS connection with the network entity and the core network, so the network entity may request the remote UE(s) to send measurement reports. The network entity or the relay UE may use the measurement reports from the remote UE(s) to determine whether to trigger the remote UE(s) mobility along with the relay UE mobility (e.g., group mobility). In other words, the source network entity or the relay UE may decide whether to move the remote UE(s) to the target network entity with the relay UE based at least in part on the measurement reports.

The network entity or the relay UE may also determine whether to trigger remote UE mobility (e.g., whether to bring remote UE) based at least in part on whether the relay UE can be configured to support Dual Active Protocol Stack (DAPS) handover (HO) to another network entity, as this may have impact on how the remote UE data being handled by the relay UE. DAPS handover is a mechanism for a UE to maintain the connection to a source network entity while moving to a target network entity to avoid or reduce interruptions in data packet delivery. Thus, the relay UE may continue to transmit and/or receive data with the source network entity during a handover process. For example, under a DAPS handover, the UE may simultaneously transmit uplink data and receive downlink user data from the source network entity and the target network entity. In some examples, for uplink transmission, the UE may continue to transmit data (e.g., PDCP data packets) to the source network entity until the UE completes the random access procedure at the target network entity, and then the UE may transmit data to the target network entity afterwards.

In some examples, if a relay UE does not support DAPS handover, during a handover procedure, the relay UE may need to send an indication to the remote UE informing the remote UE not to send any data to the relay UE as the relay UE may be unable to forward the data to the network entity or buffer the data for the remote UE. In another aspect, instead of sending the indication to the remote UE, the relay UE may start support buffering of the data received from the remote UE until the relay UE establishes the connection with the target network entity. On the other hand, if the relay UE supports DAPS handover, as the source connection between the network (e.g., source base station) and the remote UE may still be maintained, the remote UE may continue to transmit data to the relay UE and the relay UE may continue to forward data to the network entity. The relay UE may notify the remote UE about the target network entity after the relay UE successfully connects to the target network entity. Thus, whether a relay UE supports DAPS handover may affect at least how the relay UE may handle a remote UE's data, and it may also affect the network entity or the relay UE's decision on whether to take the remote UE to the target network entity. At times, the relay UE and the remote UE may coordinate with each other during a handover procedure on how the data may be transferred and/or whether the relay UE may continue to relay data for the remote UE at the target network entity, etc.

Aspects presented herein enable a relay UE to coordinate with one or more remote UE during a handover procedure (e.g., due to relay UE mobility) and determine whether the relay UE may continue to maintain the connection with the remote UE during and/or after the handover procedure, such that the interruption in data transmission for the remote UE and/or the relay UE may be minimalized. In one aspect, the remote UE may remain its connection with the relay UE while the relay UE is switching to the target network entity, and the remote UE may switch to the same target network entity as the relay UE (e.g., group handover). In other words, the relay UE and the remote UE(s) may move together to the target network entity. In another aspect, the remote UE may determine to connect to another network entity (e.g., via Uu interface) or another relay UE instead of moving with the relay UE, such as when the channel condition between the relay UE and the remote UE has deteriorated or the relay UE is no longer a suitable candidate for relaying the data for the remote UE, etc. In other words, the remote UE does not follow the relay UE(s) to the target network entity.

Figure 11:
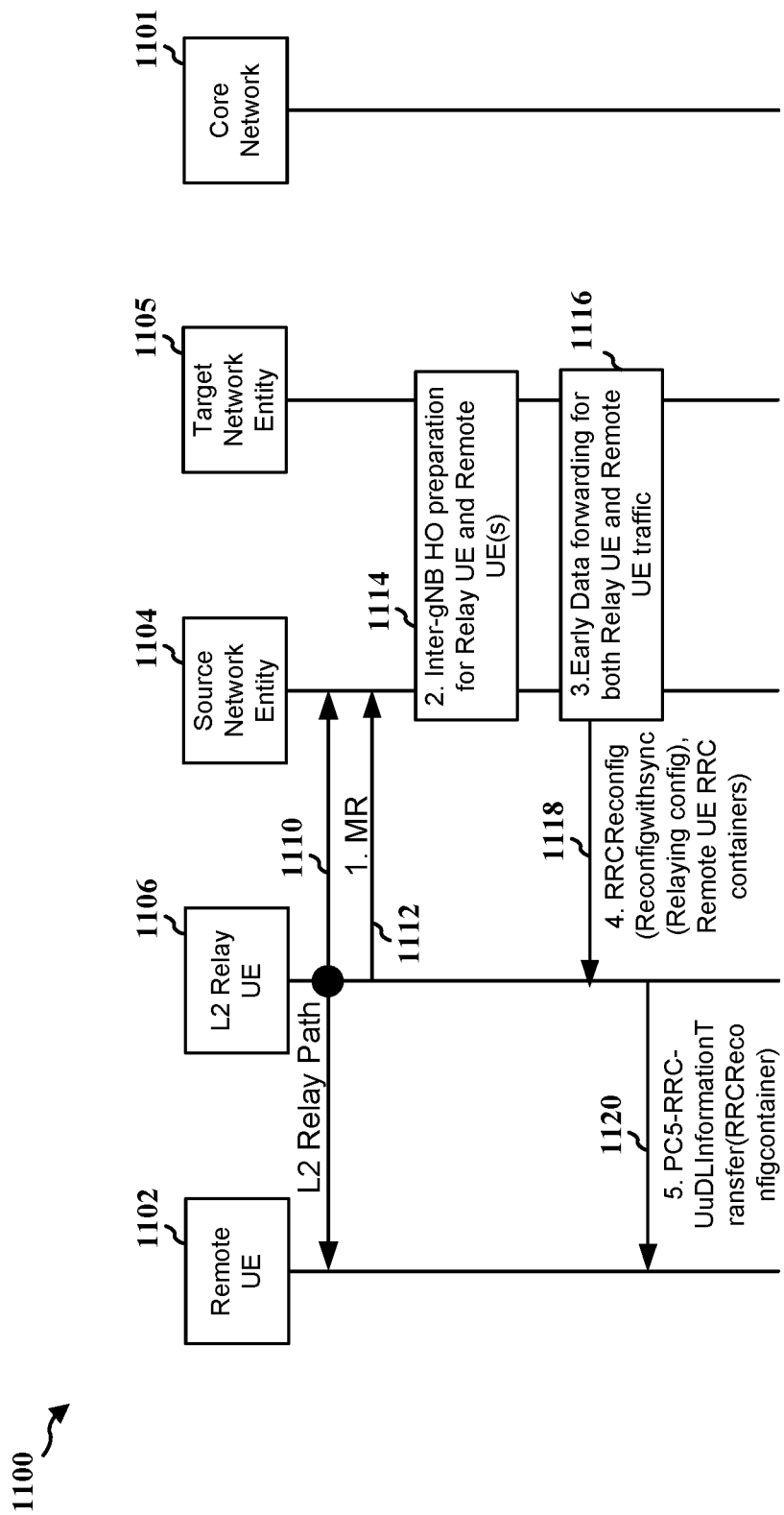
FIG. 11 is a diagram illustrating an example communication flow.

FIG. 11 is a diagram 1100 illustrating an example communication flow of a group handover. At 1110, a remote UE 1102 may be connected to a relay UE 1106, and the relay UE 1106 may be connected to a source network entity 1104. The remote UE 1102 may communicate with the network entity 1104, and may have access to the core network 1101, via the relay UE 1106. At 1112, in one aspect, the source network entity 1104 may receive measurement reports from the relay UE 1106 and/or the remote UE 1102 (e.g., at 1110 or via the relay UE 1106 at 1112). Based at least in part on the received measurement reports from the relay UE 1106 and/or the remote UE 1102, the source network entity 1104 may decide whether to initiate a handover procedure, e.g., moving the relay UE 1106 and optionally the remote UE 1102 to a target network entity 1105. In another aspect, the measurement reports from the relay UE 1106 may indicate which remote UE(s) (e.g., the likely candidates) may move with the relay UE 1106 during the handover. The relay UE 1106 may decide which remote UE(s) to bring during the handover based at least in part on a sidelink measurement report between the relay UE 1106 and the remote UE(s). Thus, based on the indication, the source network entity 1104 may also determine which remote UE(s) may potentially be included in the handover (e.g., a group handover).

If the source network entity determines to initiate the group handover, at 1114, the source network entity 1104 may configure one or more DRBs of the remote UE 1102 as DAPS DRBs, where the remote UE 1102 may continue to transmit and/or receive data using the DAPS DRBs during the group handover, such as described in connection with FIG. 5. For example, as the remote UE 1102 may have its own NAS and AS connections to the source network entity, the remote UE 1102 may also have its own PDU sessions and DRBs set up, such as described in connection with FIGS. 7, 9 and 10. Thus, the source network entity 1104 may determine that one or more of the DRBs for the remote UE 1102 may correspond to certain services that may be more susceptible to interruption during an handover, and may decide to configure them as DAPS DRBs. While the DAPS DRBs configuration may be known to the remote UE, the relay UE 1106 may not know about the DAPS DRBs configuration. Thus, to support DAPS DRBs configuration for the remote UE 1102 during a relay UE handover (e.g., mobility), the source network entity 1104 may inform the relay UE 1106 which Uu radio link control (RLC) channels of the remote UE 1102 may be handled as DAPS Uu RLC channels. In one example, the source network entity 1104 may indicate the DAPS RLC channels of the remote UE 1102 to the relay UE 1106 during an initial configuration of the Uu RLC channels for each remote UE (e.g., 1102). This may provide the source network entity 1104 with a dynamic control over the DAPS RLC channels configuration, where the configuration may be based at least in part on the loading and traffic condition. For example, during the handover, if the source channel does not have a good channel condition or the source channel is loaded or the target network entity does not support DAPS configuration, then the source channel may not be configured to support the DAPS. In another example, the source network entity 1104 may indicate the DAPS RLC channels of the remote UE 1102 in a handover command that is sent to the relay UE 1106 for group handover. For example, when a source network entity (e.g., 1104) is moving a relay UE (e.g., 1106) from the source network entity to a target network entity (e.g., 1105), the source network entity may also indicate to the relay UE any Uu RLC channels that are being handled by the remote UE and which of them are DAPS RLC channels in the handover command of the group handover, etc.

At 1114, the source network entity 1104 may prepare the target network entity 1105 for the group handover operation of the relay UE 1106 and the remote UE 1002, which may also include the DAPS DRBs preparation. The handover may be an inter-network entity (e.g., inter-gNB) handover, or the handover may be an intra-network entity (e.g., intra-gNB) handover. The source network entity 1104 may communicate with the target network entity 1105 via an Xn network interface. In one example, the source network entity 1104 may send the handover preparation message for the relay UE and each of the remote UEs separately to the target network entity 1105. For example, referring back to FIG. 5, if the network entity 504 is preparing to move the relay UE 506 and the remote UEs 502, 503 to the network entity 505, the network entity 504 may send three preparation messages to the network entity 505, one for the relay UE 506, one for the remote UE 502 and one for the remote UE 503, etc. The source network entity 1104 may also inform the target network entity 1105 which DRBs are to be handled as DAPS in the preparation message(s). Alternatively, the source network entity 1104 may send a group handover preparation message to the target network entity 1105, where the group handover preparation message may inform the target network entity 1105 that the handover is a group handover, identity of the relay UE, identity of the one or more remote UE that is moving with the relay UE, which DRBs are to be handled as DAPS, etc.

After the target network entity 1105 receives the handover preparation message(s), the target network entity 1105 may determine whether the handover and/or handover configuration(s) are supported, and may send acknowledgement message(s) to the source network entity 1104, such as confirming the handover request and/or the supported handover configuration(s) (e.g., DAPS DRBs configurations). At 1116, early or late data forwarding for both the relay UE 1106 and the remote UE 1102's traffic may be supported using the DAPS DRBs at the source network entity 1104 and/or the target network entity 1105.

At 1118, the source network entity 1104 may send the handover command, such as via a RRC reconfiguration sync message, to the relay UE 1106 and/or the remote UE 1102 informing the relay UE 1106 and/or the remote UE 1102 to move from the source network entity 1104 to the target network entity 1105. In one aspect (e.g., Option 1), as shown by FIG. 11, the source network entity 1104 may send a handover command (e.g., group handover command) to the relay UE 1106, where the handover command may also indicate which remote UE(s) may move with the relay UE 1106. The handover command for the relay UE 1106 may further include one or more remote UE handover command container(s), where each remote UE handover command container may include a handover command (e.g., RRC reconfiguration message and parameters, etc.) for each remote UE (e.g., 1102). The handover command for the relay UE 1106 and/or the remote UE handover command container may also indicate the DAPS Uu RLC channels for the remote UE. The relay UE 1106 may then transmit the remote UE handover command container to the remote UE 1102 at 1120, where the remote UE handover command container may be protected with the remote UE's security context.

By sending the relay UE 1106 a handover command with the remote UE handover command container(s) (e.g., group handover command), such as described in connection with FIG. 11, the relay UE 1106 may have more control over the handover procedure, and may inform the remote UE 1102 about the target network entity 1105 after the relay UE 1106 has successfully moved to the target network entity 1105. For example, as the relay UE 1106 may have one or more Uu RLC channels for the remote UE 1102 which may be DAPS RLC channels, the remote UE may have been transmitting and/or receiving data with the source network entity 1104 using the DAPS RLC channels. After the relay UE 1106 receives the handover command from the source network entity 1104 at 1118 and initiates the handover procedure, the remote UE 1102 may continue to transmit data to the source network entity 1104 using its DAPS RLC channels while the relay UE 1106 is performing the RRC connection with the target network entity 1105. After the relay UE 1106 completes the RRC connection with the target network entity 1105, the relay UE 1106 may inform the remote UE 1102 about the target network entity 1105 and connect the remote UE 1102 (e.g., by sending the remote UE handover command container) to the target network entity 1105. The remote UE 1102 may then transmit and receive data from the target network entity 1105. This approach may be beneficial as it minimizes interruption in data transmission for the remote UE 1102.

Figure 12:
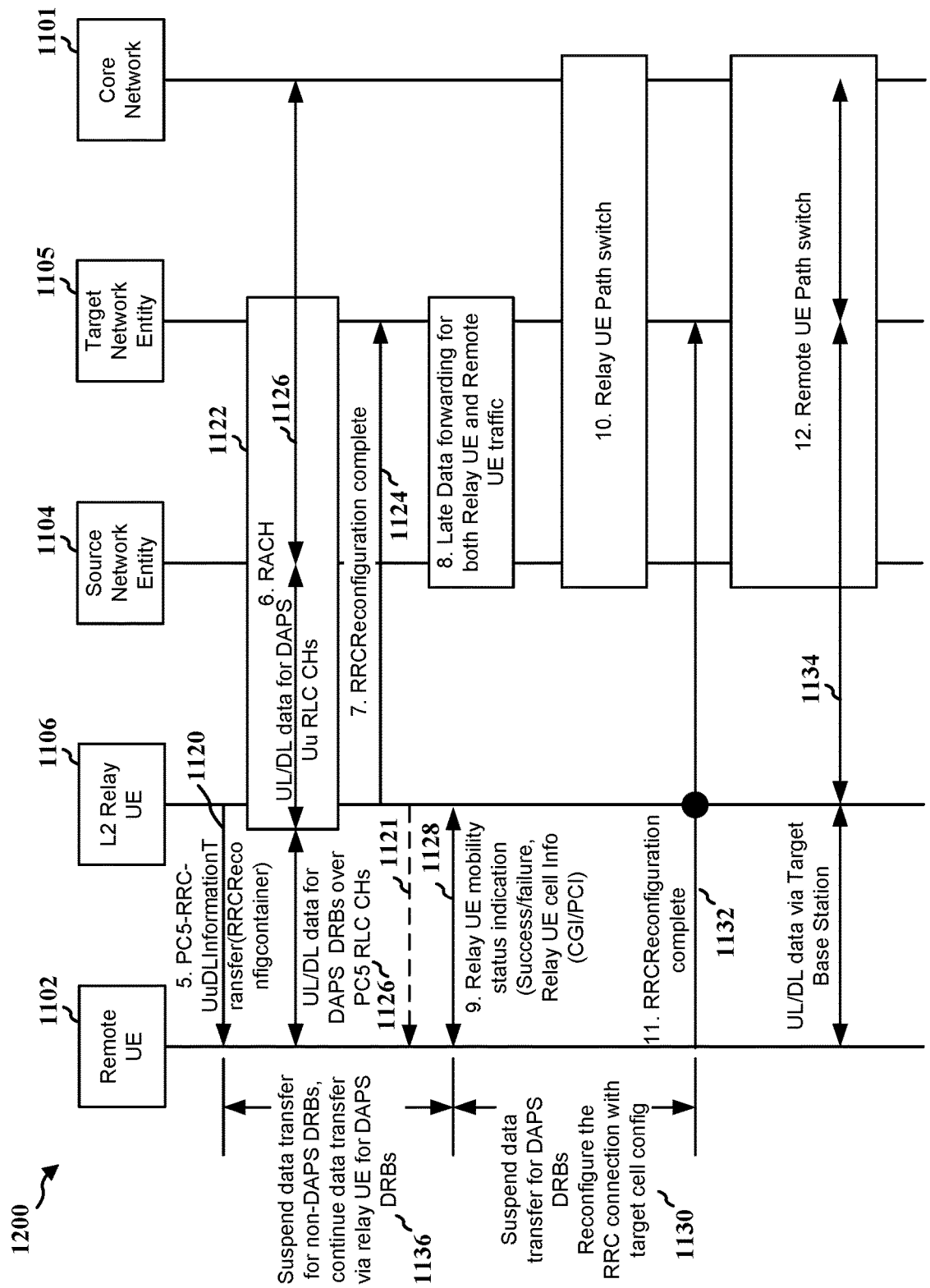
FIG. 12 is a diagram illustrating an example communication flow.

FIG. 12 is a diagram 1200 illustrating an example communication flow of the group handover (e.g., Option 1), which may be connected with the diagram 1100 of FIG. 11. As describe above, after receiving the group handover command (e.g., handover command with the remote UE handover command container(s)) at 1118 of FIG. 11, the relay UE 1106 may send the remote UE handover command container(s) to the remote UE(s) (e.g., 1102) at 1120. The relay UE 1106 may use a new PC5-RRC message (e.g., UuDLInformationTransfer) to send the remote UE handover container, or the relay UE 1106 may relay the remote UE handover container/message over the PC5 RLC channels for the remote UE Uu signaling radio bearers (SRBs) or include it in PC5 signaling message. The remote UE handover command container(s) may be sent under unicast mode (e.g., one message or container for each remote UE) or it may be sent under groupcast mode (e.g., one message or container for all the remote UEs). For the groupcast mode, a groupcast destination ID may be assigned based on the relay UE's knowledge of the group of remote UEs moving with it.

In one example, if one or more DAPS Uu RLC channels are configured for the remote UE 1102, at 1126, the relay UE 1106 may continue to support data relaying for the remote UE 1102 using the DAPS Uu RLC channels on the source network entity 1104 connection while the relay UE 1106 is performing the RACH procedure at 1122 and the RRC connection at 1124 with the target network entity 1105. After the relay UE 1106 establishes a connection with the target network entity 1105, the relay UE 1106 may set up new Uu RLC channels on the target network entity 1105 connection. At 1128, the relay UE 1106 may send an indication on the status of the target network entity 1105 connection setup (e.g., handover confirmation) to the remote UE 1102. The indication may be sent in one or more of PC5 RRC message during a handover status indication procedure or during a PC5 link modification procedure, or a relay discovery additional information (RDAI) message, etc. However, if the handover procedure is not successful, the relay UE 1106 may not send the indication to the remote UE 1102 or the relay UE may send a negative confirmation, etc.

In response to the indication from the relay UE 1106, at 1130, the remote UE 1102 may initiate the RRC reconfiguration with the target network entity 1105 based on the remote UE handover command container received at 1120, which may comprise RRC reconfiguration message and parameters for the remote UE 1102. After the RRC reconfiguration is complete at 1132, the remote UE 1102 may transmit data to and/or receive data from the target network entity 1105 at 1134 through the relay UE 1106, and may continue to have access to the core network 1101 through the relay UE 1106. In one aspect, the remote UE 1102 may be refrained from establishing the connection with the second network entity before receiving the indication.

In another example, if the Uu RLC channels configured for the remote UE 1102 are DAPS RLC channels, the relay UE 1106 may send the remote UE handover command container to the remote UE 1102, such as at 1121, after the relay UE 1106 has successfully moved to and connected with the target network entity 1105, e.g., after the relay UE 1106 has completed the RACH procedure at 1122 and the RRC connection at 1124 with the target network entity 1105. The relay UE 1106 may not send any indication at 1128 in this case and may skip this step. In other words, the relay UE may relay the handover request/message to the remote UE on (e.g., after or immediately after) receiving the handover request/message from the source network entity if there are one or more DAPS RLC channels and one or more non-DAPS RLC channels configured for the remote UE. However, the relay UE may relay the handover request/message to the remote UE after successfully establishing connection with the second network entity if there are no non-DAPS RLC channels configured for the at least one second UE.

After receiving the remote UE handover command container at 1121, the remote UE 1102 may initiate the RRC reconfiguration with the target network entity 1105 based on the remote UE handover command container. After the RRC reconfiguration is complete at 1132, the remote UE 1102 may start transmitting data to and/or receiving data from the target network entity 1105 at 1134 through the relay UE 1106, and may continue to have access to the core network 1101 through the relay UE 1106.

In one other example, if both DAPS Uu RLC channels and non-DAPS Uu RLC channels are configured for the remote UE 1102, the relay UE 1106 may send the remote UE handover command container to the remote UE 1102 at 1120 as well. At 1136, the remote UE 1102 may suspend data transfer for non-DAPS Uu RLC channels, and may continue data transmission via the relay UE 1106 using DAPS Uu RLC channels. Similarly, the relay UE 1106 may then send an indication on the status of the target network entity 1105 connection setup to the remote UE 1102 at 1128, where the indication may include information related to the target network entity 1105, such as new PC5-RRC message procedure, PC5 link modification and/or Relay Discovery Additional Information (RDAI) in case of handover success. In response to the indication, at 1130, the remote UE 1102 may initiate the RRC reconfiguration with the target network entity 1105 based on the remote UE handover command container received at 1120. After the RRC reconfiguration is complete at 1132, the remote UE 1102 may transmit data to and/or receive data from the target network entity 1105 at 1134 through the relay UE 1106, and may continue to have access to the core network 1101 through the relay UE 1106.

Figure 13:
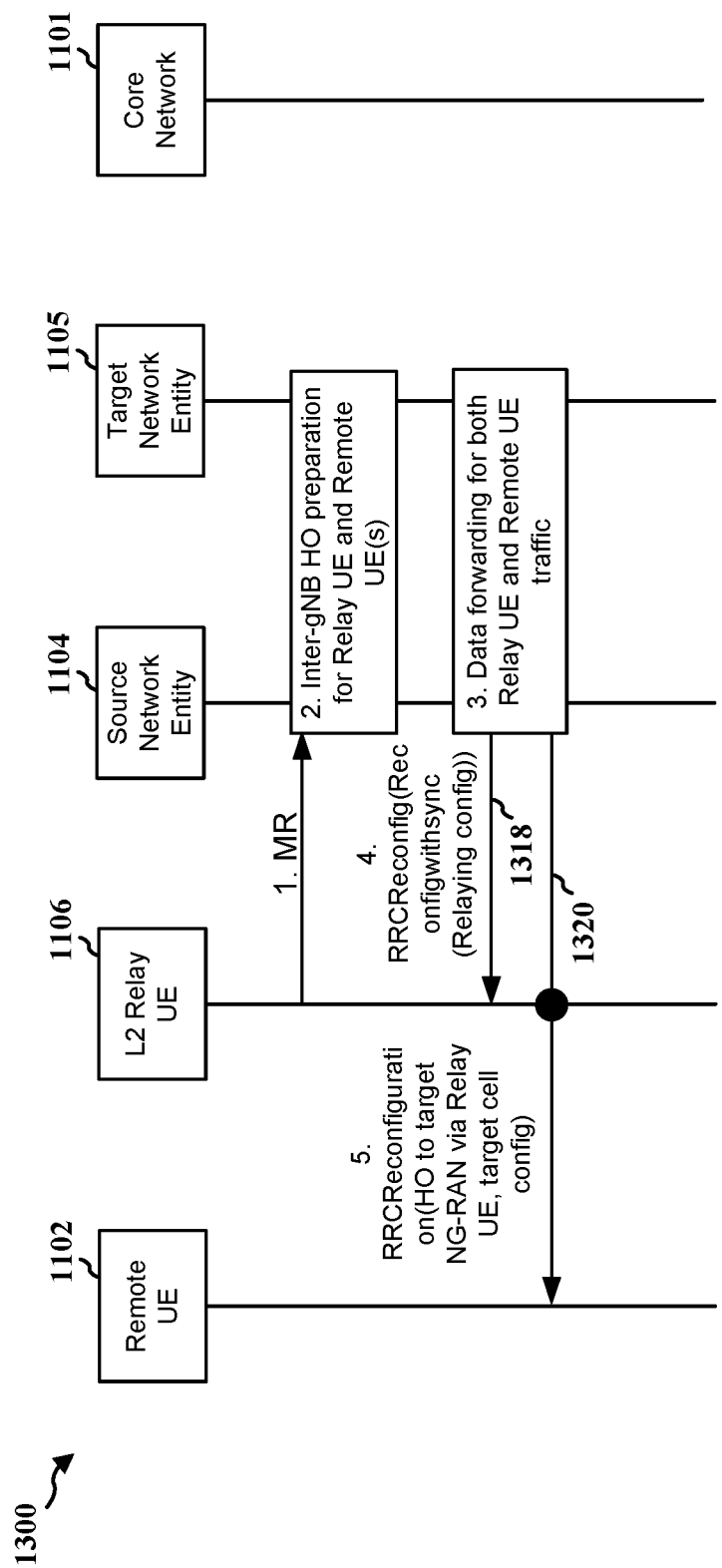
FIG. 13 is a diagram illustrating an example communication flow.

In another aspect (e.g., Option 2), as shown by diagram 1300 in FIG. 13, the source network entity 1104 may send handover command to the relay UE 1106 and each of the remote UE (e.g., 1102) separately instead of in one message (e.g., 1120) to initiate the handover (e.g., individual handover). For example, the source network entity 1104 may send a handover command to the relay UE 1106 at 1318, and may send another handover command to the remote UE 1102 at 1320. The handover command for the remote UE 1102 at 1320 may include RRC reconfiguration message and parameters for the remote UE 1102, such as configuration for connecting to the target network entity (e.g., target cell config). The source network entity 1104 may send the handover command to the relay UE 1106 and the remote UE 1102 simultaneously, or the source network entity 1104 may send the handover command to the relay UE 1106 or the remote UE 1102 first, and the other one afterwards depending on the configuration, e.g., the handover command may be sent to the relay UE 1106 at 1318 after the handover command is sent to the remote UE 1102 at 1320, etc.

Figure 14:
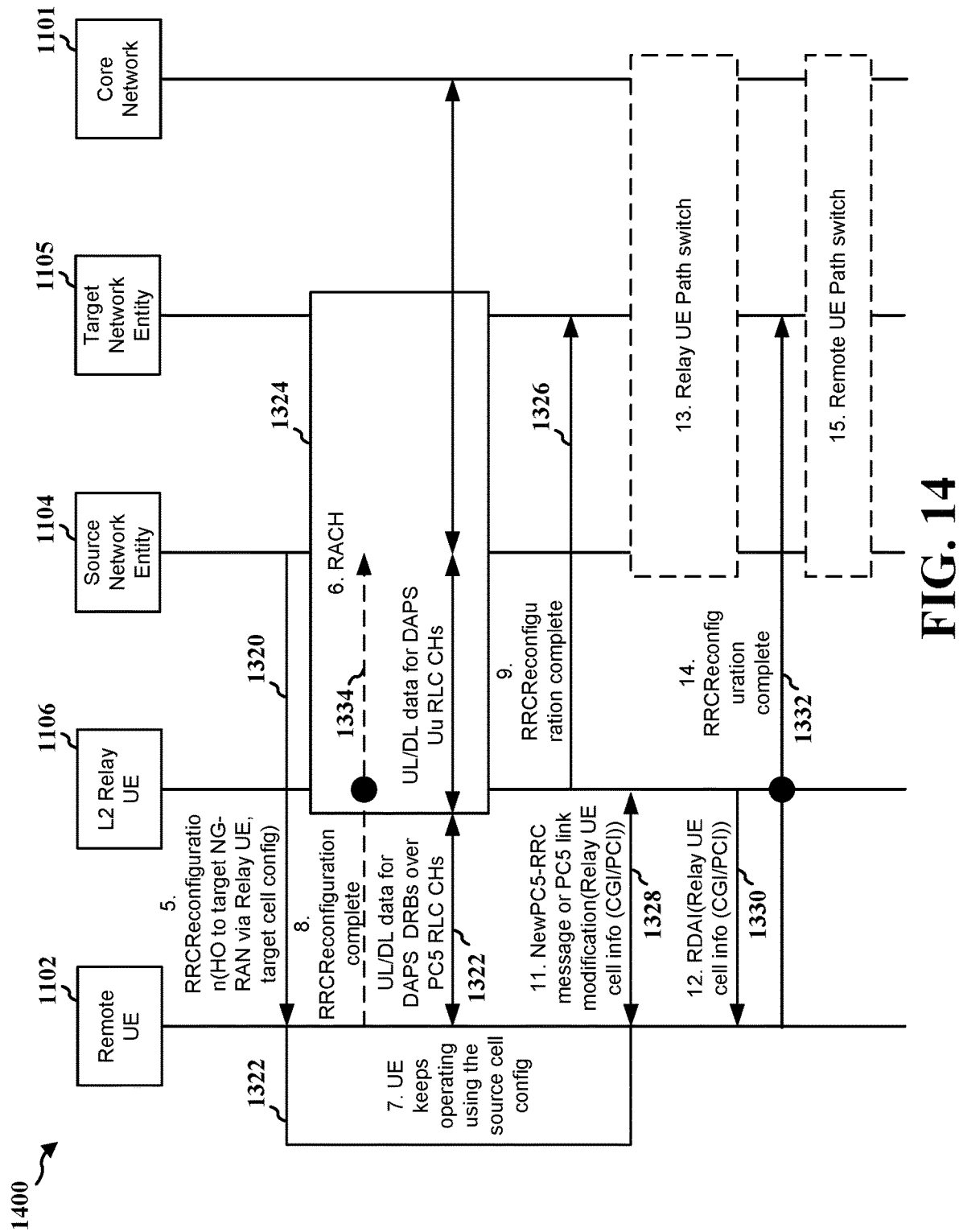
FIG. 14 is a diagram illustrating an example communication flow.

FIG. 14 is a diagram 1400 illustrating an example communication flow of the individual handover (e.g., Option 2), which may be connected with the diagram 1300 of FIG. 13. After the remote UE 1102 receives the handover command (e.g., RRC reconfiguration) from the source network entity 1104 at 1320, the remote UE 1102 may check whether it is connected to the target network entity 1105 via the same relay UE 1106. In one example, the remote UE 1102 may verify whether it is connected to the same relay UE based at least in part on an identification of the relay UE (e.g., relay UE ID) in the handover command. In another example, the remote UE 1102 may receive an explicit indication of a relay UE change via an information element (IE) in the handover command from the source network entity 1104, where the source network entity 1104 may explicitly inform the remote UE 1102 that its relay UE has changed. In addition, when the remote UE 1102 receives the handover command at 1320 and there are one or more DAPS DRBs configured for the remote UE 1102, at 1322, the remote UE 1102 may continue the data transfer via the source relay path (e.g., with the source network entity 1104) for any Uu DRBs configured with DAPS handover (e.g., DAPS DRBs). If there are non-DAPS DRBs, the remote UE 1102 may suspend data transfer via the source relay path for non-DAPS DRBs.

After that, the remote UE 1102 may wait for a handover success indication from a relay UE (e.g., 1106). In one aspect, if there are one or more DAPS DRBs configured for the remote UE 1102, the remote UE 1106 may not start the reconfiguration (e.g., moving) to the target network entity 1105 via the relay UE 1106 until the remote UE 1106 receives a handover success indication from the relay UE 1106, e.g., after the relay UE 1106 completes the RACH procedure at 1324 and the RRC connection at 1326 with the target network entity 1105. For example, at 1328, the relay UE 1106 may send an indication to the remote UE 1102 informing the handover success and/or the network entity change (e.g., the target network entity 1105 CGI and/or PCI information) via a new PC5-RRC procedure or PC5 link modification procedure. At 1330, the relay UE 1106 may send information related to the target network entity 1105 (e.g., gNB cell info(CGI/PCI)) to the remote UE 1102 in an RDAI message. In response, at 1332, based at least in part on the RDAI message (e.g., the Relay UE cell info), the remote UE 1102 may determine that the relay UE's connection has changed to the target network entity 1105, and may send an RRC reconfiguration confirmation message (e.g., RRCReconfigComplete) to the target network entity 1105 using the target network entity configuration (e.g., received at 1320). The remote UE 1102 may then perform data transfer using the target network entity configuration after successful transmitting the RRC reconfiguration confirmation message at 1332.

On the other hand, at 1320, if there are no DAPS DRBs configured for the remote UE 1102, the remote UE 1102 may suspend data transfer via the source relay path (e.g., with the source network entity 1104) and may reconfigure a new relay path with the target network entity 1105 using the target network entity configuration received at 1320. Similarly, at 1334, the remote UE 1102 may send an RRC reconfiguration confirmation message (e.g., RRCReconfigComplete) to the target network entity 1105 using the target network entity configuration (e.g., received at 1320). The remote UE 1102 may then perform data transfer using the target network entity configuration after successful transmitting the RRC reconfiguration confirmation message at 1334.

As described previously, during a relay UE mobility (e.g., handover), the remote UE may choose to connect to another network entity (e.g., via Uu interface) or another relay UE instead of moving with the relay UE, such as when the channel condition between the relay UE and the remote UE has deteriorated or the relay UE is no longer a suitable candidate for relaying the data for the remote UE, etc.

Figure 15:
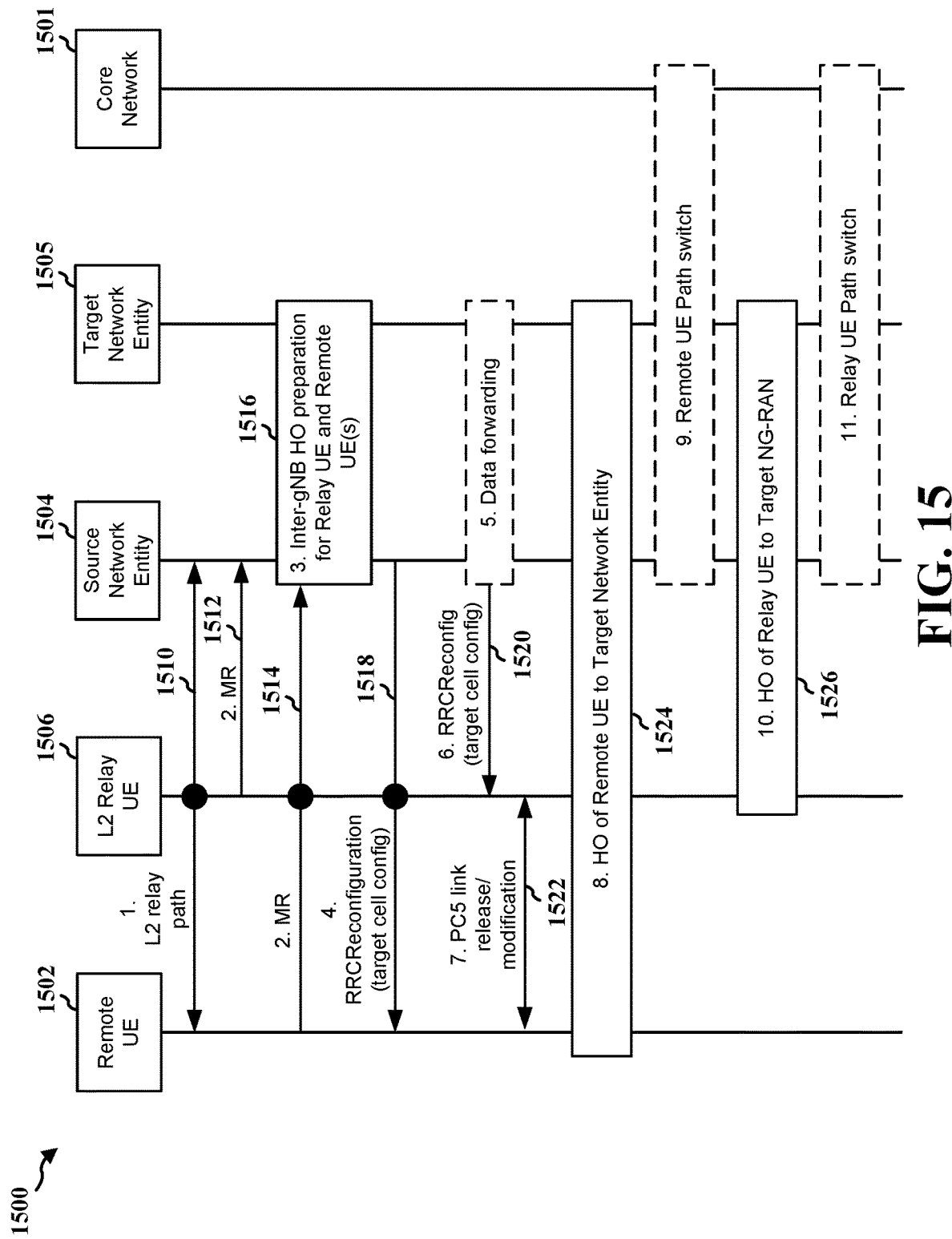
FIG. 15 is a diagram illustrating an example communication flow.

FIG. 15 is a diagram 1500 illustrating an example communication flow of a remote UE switching to a Uu connection with a network entity after a handover procedure is initiated at its serving relay UE. At 1510, a remote UE 1502 may initially be connected to a relay UE 1506 (e.g., L2 relay UE), and the relay UE 1506 may be connected to a source network entity 1504. The remote UE 1502 may communicate with the source network entity 1504 and the core network 1501 via the relay UE 1506. At 1512 and/or 1514, the relay UE 1506 and/or the remote UE 1502 may send measurement report(s) to the source network entity 1504, and the source network entity 1504 may determine whether to handover the relay UE 1506 to a target network entity 1505 based at least in part on the measurement report(s) received from the relay UE 1506 and/or the remote UE 1502. If the source network entity determines to handover the relay UE 1506 and optionally one or more remote UE connecting to the relay UE 1506 to the target network entity 1505, at 1516, the source network entity may communicate with the target network entity 1505 regarding the handover, such as described in connection with 1114 of FIG. 11. During handover preparation at 1516, the source network entity 1504 may determine that it is better for the remote UE 1502 to be moved to a Uu connection with a network entity instead of continuing to connect with the relay UE 1506 (e.g., move with the relay UE 1506). At 1518, the source network entity 1504 may send a handover command (e.g., RRC Reconfiguration) or an independent indication to the remote UE 1502 informing the remote UE to move to another network entity (e.g., which may include the target network entity 1505). The handover command or the indication may be a direct handover instruction informing the remote UE 1502 to move to another network entity, and may not indicate that the relay UE 1506 is moving to the target network entity 1505. However, the remote UE 1502 may be able to differentiate whether the handover is a group handover, such as described in connection with FIGS. 11 and 12, or a direct handover based at least in part on the content of the handover command. For example, for a direct handover, information related to the relay UE may not present in the handover command, such that the remote UE may assume it is a direct handover without the relay UE, etc. Similarly, at 1520, the source network entity 1504 may also send a handover command to the relay UE 1506 to move the relay UE 1506 to the target network entity 1505. The remote UE 1502 and the relay UE 1506 may each perform the handover procedure independently. At 1522, in response to the handover command or the indication received from the source network entity 1504 at 1518, the remote UE 1502 may perform PC5 link (e.g., link with the relay UE 1506) release and/or modification (e.g., PC5 link may be reused). Either the remote UE 1502 or the relay UE 1506 may initiate the PC5 link release or modification prior to the handover execution. At 1524, the remote UE 1502 may be connected to another network entity and may start data transmission with the network entity, which the network entity may also be the target network entity 1505. Similarly, at 1526, the relay UE 1506 may complete the handover procedure and be handed over to the target network entity 1505, and may start data transmission with the target network entity 1505.

At times, the relay UE may experience failure on its Uu link with the network entity (e.g., the source network entity, the target network entity, etc.) while one or more remote UE(s) is connected to the relay UE. For examples, the failure may be caused by Uu radio link failure (RLF), Uu handover failure, Uu reconfiguration failure, etc. In response to the Uu link failure, the relay UE may trigger a reestablishment procedure (e.g., RRC reestablishment). During the reestablishment procedure, the relay UE may not be able to relay data for the remote UE until the reestablishment procedure is completed. Thus, there may be a duration where the relay UE may buffer the remote UE's data for the remote UE.

Aspects presented herein may enable a relay UE to handle link failure, such as during a handover procedure (e.g., relay UE mobility failure). In one aspect, after the relay UE detects a link failure or initiates a reestablishment procedure, the relay UE may release or suspend the PC5 link (e.g., remote UE PC5 link) with active remote UE(s). The relay UE may optionally send an indication to the remote UE(s) informing the remote UE(s) that the relay UE is unable to perform data relaying. In response to the indication, the remote UE(s) may stay connected to the relay UE, but may discontinue to transmit data to the relay UE (e.g., suspending the PC5 link), or the remote UE may release the PC5 link and try to connect to other relay UE or network entity. In addition, during the link failure and/or the reestablishment procedure, the relay UE may also discontinue to advertise the support of relaying or indicate temporary unavailability of relaying support in its discovery messages. This may enable the relay UE to minimize its buffering requirement for the relay data. The released or suspended PC5 link may be reestablished or unsuspended (e.g., resumed) after the relay UE has reestablished a Uu connection with a network entity. For example, after successful Uu link setup, the relay UE may resumes the suspended PC5 links with the remote UE(s), and may continue to follow the relay advertisement criteria to advertise for relay service support in its discovery messages or remote UE may resume the suspended PC5 link with the relay UE on receiving the relaying availability indication in relay discovery messages.

In another aspect, if one or more DAPS Uu RLC channels are configured for the remote UE(s) while the relay UE is experiencing Uu link handover failure (e.g., relay UE DAPS mobility failure), the relay UE may maintain the source connection (e.g., with the source base station). For example, a relay UE may be connected to a remote UE with DAPS DRBs configured for the remote UE, and the relay UE may try to move (e.g., handover) from a source network entity to a target network entity. If the move fails, the relay UE may fall back to the connection with the source network entity and the remote UE may continue to transmit or receive data using the DAPS DRBs. In another example, if the handover of a relay UE to the target network entity fails while there are DAPS Uu RLC channels configured for the remote UE, the relay UE may send a relay UE handover failure notification to the remote UE. The relay UE may then fall back to the source connection and resume the non-DAPS Uu RLC channels relaying on the source connection. The relay UE may also release the remote UE handover command containers received from the source network entity for group handover mobility, such as described at 1118 of FIG. 11. After receiving the relay UE handover failure notification, the remote UE may release the target network entity configuration (e.g., received at 1320 of FIG. 13) and the remote UE may resumes non-DAPS DRB data transfer on the source relay path.

Figure 16:
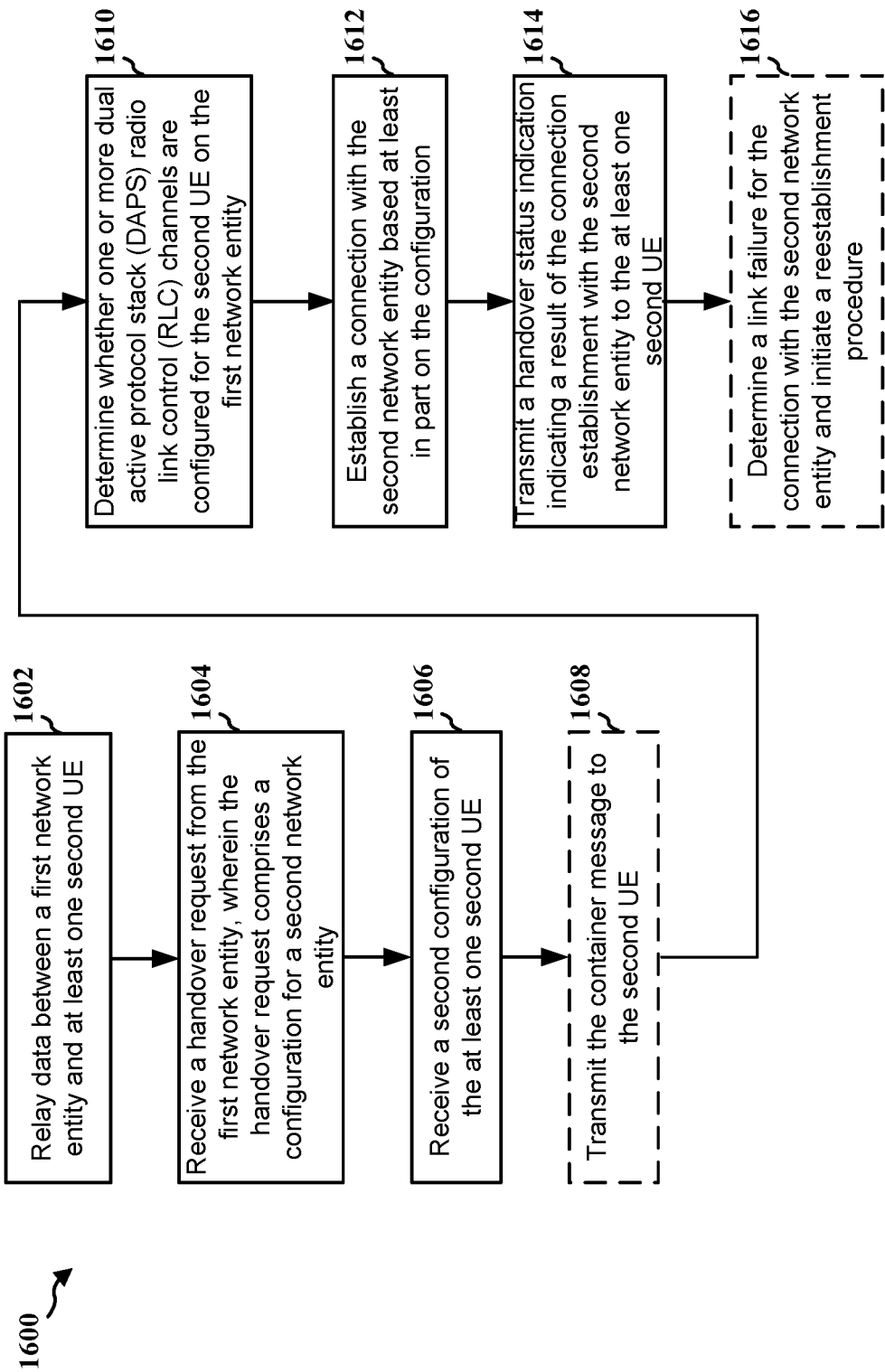
FIG. 16 is a flowchart of a method of wireless communication.

FIG. 16 is a flowchart of a method 1600 of wireless communication. The method may be performed by a first UE (e.g., a relay UE) or a component of a first UE (e.g., the UE 106, 350, 406, 1106, 1506; a processing system, which may include the memory 360 and which may be the entire UE 350 or a component of the UE 350, such as the TX processor 368, the RX processor 356, and/or the controller/processor 359). Optional aspects are illustrated with a dashed line. The method may enable the first UE to relay data for a second UE (e.g., a remote UE 104, 402, 1102, 1502) while the first UE is moving from a first network entity (e.g., source network entity 102, 404, 1104, 1504) to a second network entity (e.g., target network entity 1105, 1505).

At 1602, the first UE may relay data between a first network entity and at least one second UE, such as described in connection with FIGS. 5, 11 to 15. The first UE may transmit a measurement report (e.g., 1112, 1512) reporting a channel condition to the first network entity.

At 1604, the first UE may receive a handover request (e.g., 1118, 1318, 1520) from the first network entity, where the handover request may comprise a configuration for a second network entity, such as described in connection with FIGS. 5, 11 to 15. For example, the configuration may be an RRC reconfiguration. In one aspect, the handover request may comprises a handover message for the second UE, such as described in connection with FIG. 11. The handover message may comprise a radio resource (e.g., Uu) RRC reconfiguration for the at least one second UE, where the at least one second UE may establish a connection with the second network entity based at least in part on the RRC reconfiguration in the handover message.

At 1606, the first UE may receive, from the first network entity, a second configuration of the at least one remote UE, such as described in connection with FIGS. 5, 11 to 15.

At 1608, the first UE may transmit the handover message to the at least one second UE, such as described in connection with FIG. 11. The handover message may be transmitted to the at least one second UE in a PC5 RRC message, and the handover message may be transmitted to the at least one second UE under unicast or groupcast mode. If the handover message is transmitted under the groupcast mode, the groupcast mode may comprise a group destination identification (ID) generated based at least in part on the first UE's association with the at least one second UE and other UE, such as described in connection with FIG. 12.

At 1610, the first UE may determine whether one or more DAPS RLC channels are configured for the at least one second UE on the first network entity, such as described in connection with FIGS. 5, 11 to 15. The first UE may relay the handover message to the at least one second UE over the PC5 RLC channels for the at least one second UE signaling radio bearers or include it in PC5 signaling message. In addition, when the first UE determines that one or more DAPS RLC channels are configured for the at least one second UE, the first UE may relay data for the at least one second UE using the one or more DAPS RLC channels on the first network entity connection while establishing a connection with the second network entity.

At 1612, the first UE may establish or start to establish a connection with the second network entity based at least in part on the configuration received in the handover request, such as described in connection with FIGS. 5, 11 to 15. In some examples, The first UE may relay the handover request to the at least one second UE on (e.g., immediately after) receiving the handover request from the first network entity if there are one or more DAPS RLC channels and one or more non-DAPS RLC channels configured for the at least one second UE. However, if there are no non-DAPS RLC channels configured for the at least one second UE, the first UE may relay the handover request to the at least one second UE after successfully establishing connection with the second network entity.

At 1614, after the connection is established, the first UE may transmit a handover status indication indicating a result of the connection establishment with the second network entity to the at least one second UE, where the result may indicate whether the handover succeeds or fails. The handover status indication may be sent in one or more of PC5 RRC message during a handover status indication procedure or during a PC5 link modification procedure, or a relay discovery additional information (RDAI) message, etc. The first UE may then relaying data to and from the second network entity for the at least one second UE.

At 1616, during the handover procedure, the first UE may determine a link failure for the connection with the second network entity, and the at least one second UE may initiate a reestablishment procedure. During the reestablishment procedure, the first UE may release or suspend a link between the first UE and the at least one second UE. The first UE may also discontinue to advertise relaying support or indicate temporary unavailability of relaying support in a discovery message. If one or more DAPS RLC channels are configured for the second UE, the first UE may send a handover failure notification to the second UE, and the first UE may fall back to a source connection with the first network entity and resuming one or more non-DAPS RLC channels relaying on the source connection for the second UE. If the handover request includes the handover message, the first UE may release the handover message. After the first UE completes the reestablishment procedure successfully, the first UE may resume suspended link between the first UE and the at least one second UE and/or following a relay advertisement criteria to advertise for relay service support.

Figure 17:
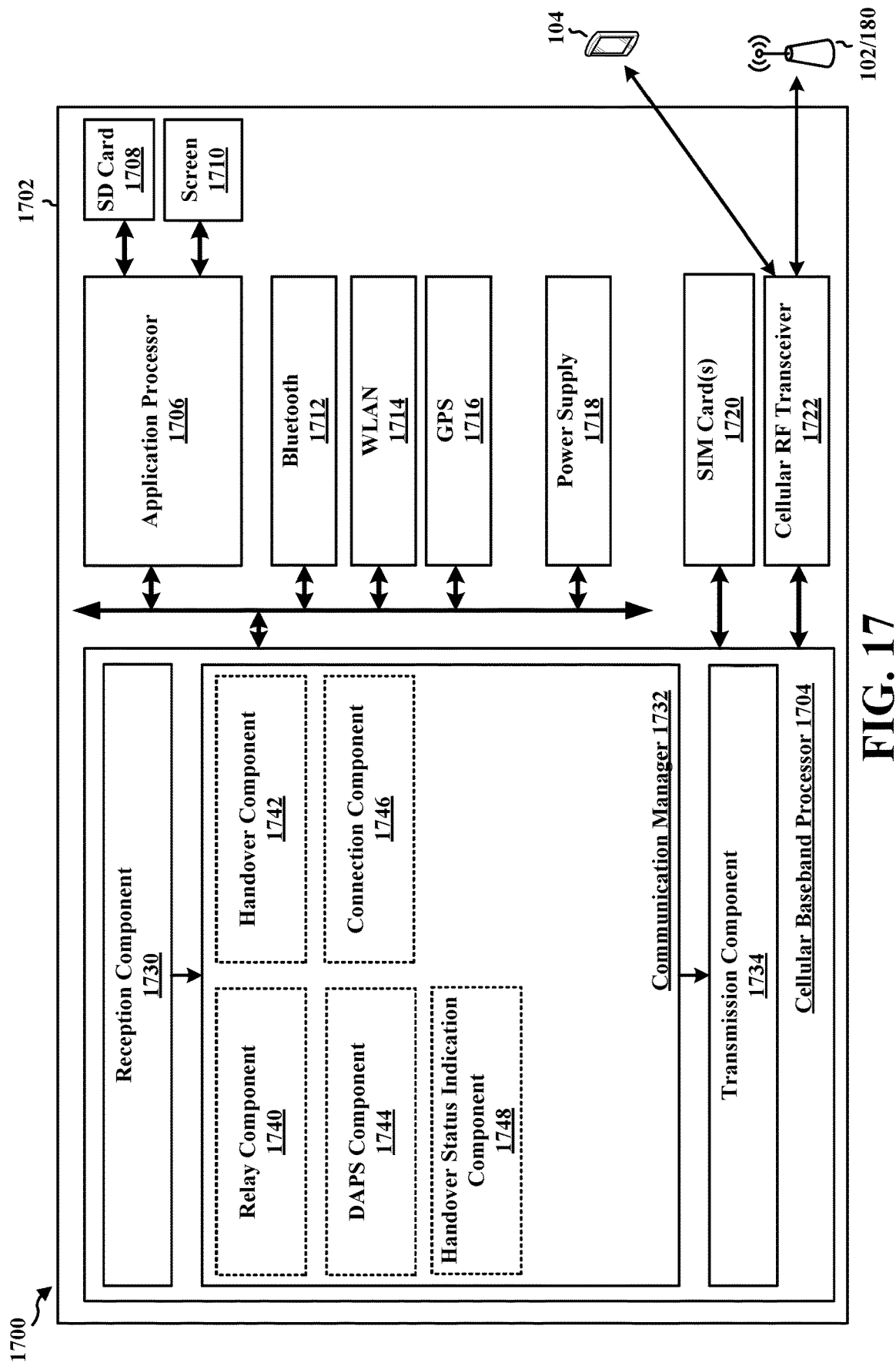
FIG. 17 is a diagram illustrating an example of a hardware implementation for an example apparatus according to some aspects.

FIG. 17 is a diagram 1700 illustrating an example of a hardware implementation for an apparatus 1702. The apparatus 1702 is a UE and includes a cellular baseband processor 1704 (also referred to as a modem) coupled to a cellular RF transceiver 1722 and one or more subscriber identity modules (SIM) cards 1720, an application processor 1706 coupled to a secure digital (SD) card 1708 and a screen 1710, a Bluetooth module 1712, a wireless local area network (WLAN) module 1714, a Global Positioning System (GPS) module 1716, and a power supply 1718. The cellular baseband processor 1704 communicates through the cellular RF transceiver 1722 with the UE 104 and/or network entity 102/180. The cellular baseband processor 1704 may include a computer-readable medium/memory. The cellular baseband processor 1704 is responsible for general processing, including the execution of software stored on the computer-readable medium/memory. The software, when executed by the cellular baseband processor 1704, causes the cellular baseband processor 1704 to perform the various functions described supra. The computer-readable medium/memory may also be used for storing data that is manipulated by the cellular baseband processor 1704 when executing software. The cellular baseband processor 1704 further includes a reception component 1730, a communication manager 1732, and a transmission component 1734. The communication manager 1732 includes the one or more illustrated components. The components within the communication manager 1732 may be stored in the computer-readable medium/memory and/or configured as hardware within the cellular baseband processor 1704. The cellular baseband processor 1704 may be a component of the UE 350 and may include the memory 360 and/or at least one of the TX processor 368, the RX processor 356, and the controller/processor 359. In one configuration, the apparatus 1702 may be a modem chip and include just the baseband processor 1704, and in another configuration, the apparatus 1702 may be the entire UE (e.g., see 350 of FIG. 3) and include the aforementioned additional modules of the apparatus 1702.

The communication manager 1732 includes a component 1740 that is configured to relay data between a first network entity and at least one second UE, e.g., as described in connection with 1602 of FIG. 16. The communication manager 1732 further includes a component 1742 that is configured to receive a handover request from the first network entity, wherein the handover request comprises a configuration for a second network entity s, e.g., as described in connection with 1604 of FIG. 16. The communication manager 1732 further includes a component 1744 that is configured to determine whether one or more DAPS RLC channels are configured for the second UE on the first network entity, e.g., as described in connection with 1610 of FIG. 16. The communication manager 1732 further includes a component 1746 that is configured to establish a connection with the second network entity based at least in part on the configuration, e.g., as described in connection with 1612 of FIG. 16. The communication manager 1732 further includes a component 1748 that is configured to transmit a handover status indication indicating a result of the connection establishment with the second network entity to the at least one second UE, e.g., as described in connection with 1614 of FIG. 16.

The apparatus may include additional components that perform each of the blocks of the algorithm in the aforementioned flowcharts of FIG. 16. As such, each block in the aforementioned flowcharts of FIG. 16 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof. In one configuration, the apparatus 1702, and in particular the cellular baseband processor 1704, includes means for relaying data between a first network entity and at least one second UE; means for receiving a handover request from the first network entity, wherein the handover request comprises a configuration for a second base station; means for determining whether one or more DAPS RLC channels are configured for the second UE on the first base station; means for establishing a connection with the second network entity based at least in part on the configuration; and means for transmitting a handover status indication indicating a result of the connection establishment with the second network entity to the at least one second UE. The aforementioned means may be one or more of the aforementioned components of the apparatus 1702 configured to perform the functions recited by the aforementioned means. As described supra, the apparatus 1702 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 18:
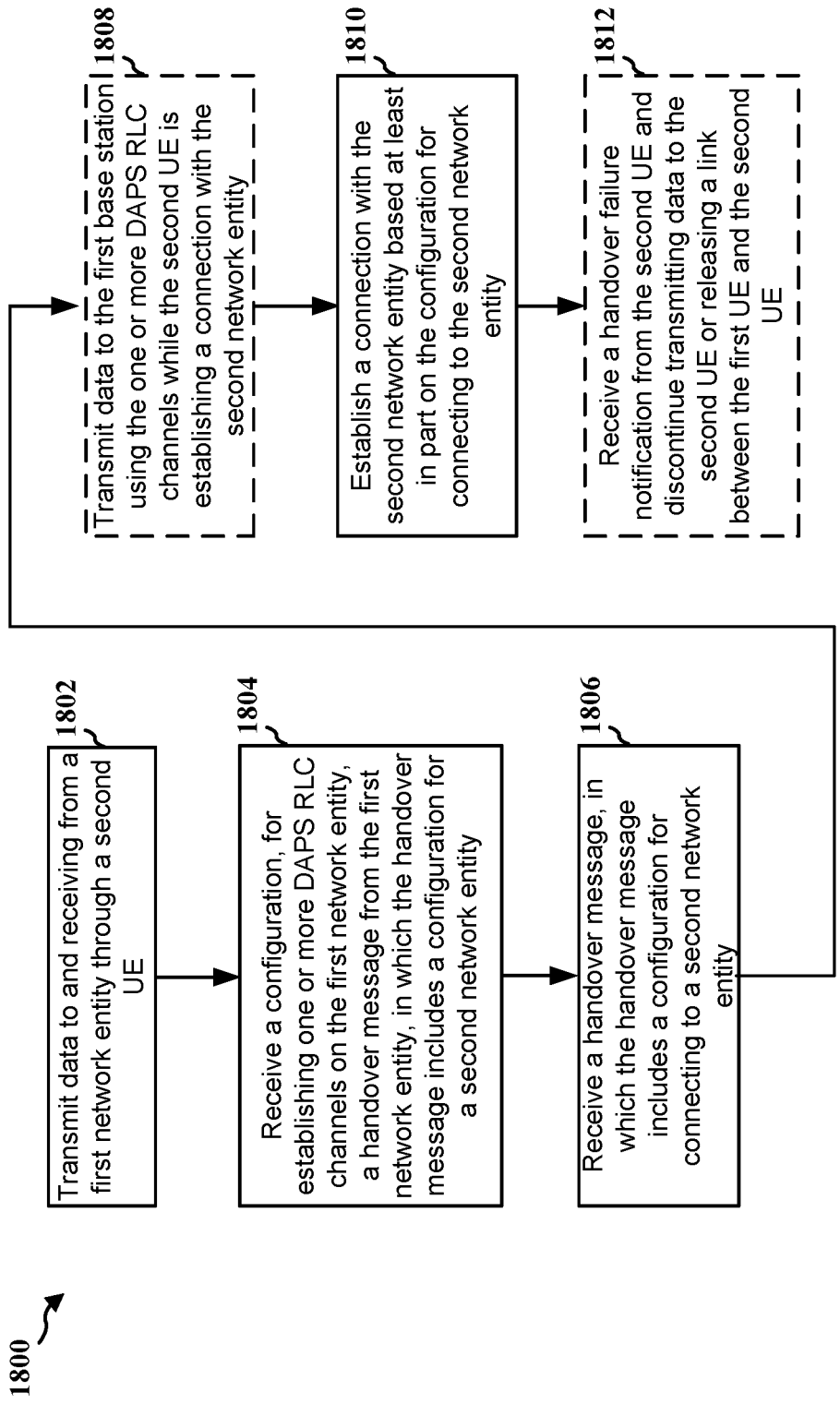
FIG. 18 is a flowchart of a method of wireless communication.

FIG. 18 is a flowchart of a method 1800 of wireless communication. The method may be performed by a first UE (e.g., a remote UE) or a component of a first UE (e.g., the UE 104, 402, 350, 1102, 1502; a processing system, which may include the memory 360 and which may be the entire UE 350 or a component of the UE 350, such as the TX processor 368, the RX processor 356, and/or the controller/processor 359). Optional aspects are illustrated with a dashed line. The method may enable the first UE to transmit data to a first network entity (e.g., source network entity 102, 404, 1104, 1504) through a second UE (e.g., the relay UE 106, 350, 406, 1106, 1506) while the second UE is moving to a second network entity (e.g., target network entity 1105, 1505).

At 1802, the first UE may transmit data to and receiving from a first network entity through a second UE, such as described in connection with FIGS. 5, 11 to 15. The first UE may transmit a measurement report to the second UE and/or the first network entity reporting a channel condition.

At 1804, the first UE may receive a configuration for establishing one or more DAPS RLC channels on the first network entity, such as described in connection with FIGS. 11 to 15.

At 1806, the first UE may receive a handover message, where the handover message may comprise a configuration for connecting to a second network entity, such as described in connection with FIGS. 5, 11 and 13. The configuration for connecting to the second network entity may be a RRC reconfiguration. In one example, the first UE may receive the handover message from the second UE in a message container, and the handover message may be transmitted to the second UE from the first network entity, such as described in connection with FIGS. 11 and 13. For example, the first UE may receive the handover message from the second UE in a PC5 RRC message or over one or more PC5 RLC channels corresponding to a first UE radio access SRBs, and the handover message may be transmitted to the second UE from the first network entity. In addition, the first UE may receive the handover message under unicast or groupcast mode. In another example, the first UE may receive the handover message directly from the first network entity. For example, the handover message may be received over the one or more DAPS RLC channels. When the first UE receives the handover message, the first UE may optionally determine from the handover message whether the first UE is to perform the handover to the second network entity via the second UE or another UE based at least in part on a second UE identifier in the handover message or an explicit indication of second UE change in the handover message.

At 1808, the first UE may transmit data to the first network entity using the one or more DAPS RLC channels while the second UE is establishing a connection with the second network entity, such as described in connection with FIGS. 12 and 14. However, the first UE may suspend data transmission to the first network entity on one or more non-DAPS RLC channels while the second UE is establishing a connection with the second network entity. After the second UE establishes the connection with the second network entity, the first UE may receive a handover status indication from the second UE indicating whether the second UE has successfully established a connection with the second network entity. The first UE may receive handover status indication in one or more of PC5 RRC message during a handover status indication procedure or during PC5 link modification procedure, or a relay discovery additional information (RDAI) message, etc. The first UE may be refrained from establishing a connection with the second network entity before receiving the handover status indication from the second UE, if there are one or more non-DAPS RLC channels configured for the first UE.

At 1810, the first UE may establish a connection with the second network entity based at least in part on the configuration for connecting to the second network entity, such as described in connection with FIGS. 12 and 14. For example, the first UE may establish the connection with the second network entity immediately after receiving the handover message if there are no non-DAPS RLC channels configured for the first UE. The second UE may then start to transmit data to and receive data from the second network entity through the second UE after the connection is established.

At 1812, the first UE may receive a handover failure notification from the second UE, and the first UE may discontinue transmitting data to the second UE or releasing a link between the first UE and the second UE. In addition, the first UE may release the configuration for connecting to the second network entity. The first UE may also resume data transmission using one or more non-DAPS DRBs on the first network entity.

Figure 19:
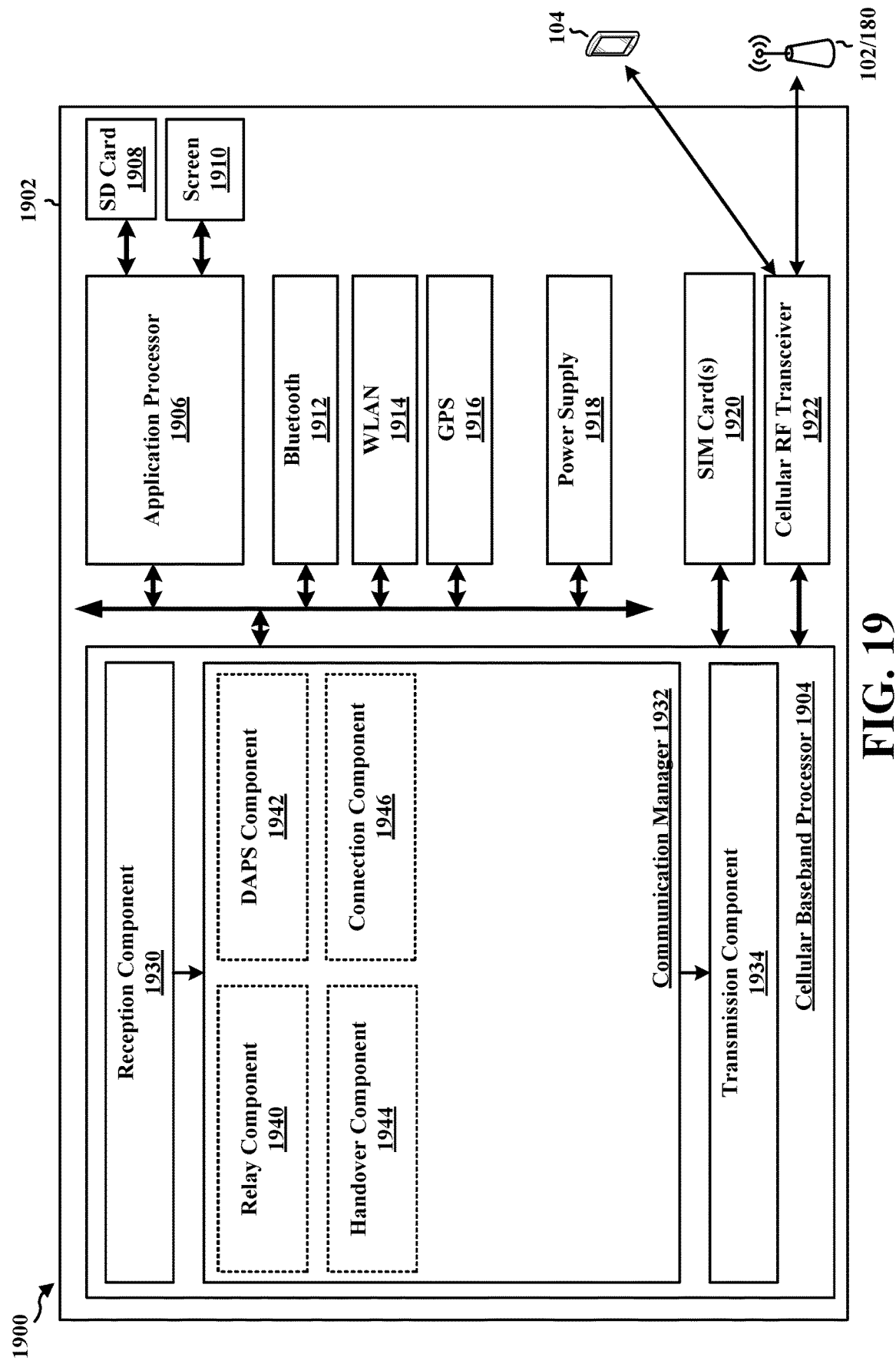
FIG. 19 is a diagram illustrating an example of a hardware implementation for an example apparatus according to some aspects.

FIG. 19 is a diagram 1900 illustrating an example of a hardware implementation for an apparatus 1902. The apparatus 1902 is a UE and includes a cellular baseband processor 1904 (also referred to as a modem) coupled to a cellular RF transceiver 1922 and one or more subscriber identity modules (SIM) cards 1920, an application processor 1906 coupled to a secure digital (SD) card 1908 and a screen 1910, a Bluetooth module 1912, a wireless local area network (WLAN) module 1914, a Global Positioning System (GPS) module 1916, and a power supply 1918. The cellular baseband processor 1904 communicates through the cellular RF transceiver 1922 with the UE 104 and/or network entity 102/180. The cellular baseband processor 1904 may include a computer-readable medium/memory. The cellular baseband processor 1904 is responsible for general processing, including the execution of software stored on the computer-readable medium/memory. The software, when executed by the cellular baseband processor 1904, causes the cellular baseband processor 1904 to perform the various functions described supra. The computer-readable medium/memory may also be used for storing data that is manipulated by the cellular baseband processor 1904 when executing software. The cellular baseband processor 1904 further includes a reception component 1930, a communication manager 1932, and a transmission component 1934. The communication manager 1932 includes the one or more illustrated components. The components within the communication manager 1932 may be stored in the computer-readable medium/memory and/or configured as hardware within the cellular baseband processor 1904. The cellular baseband processor 1904 may be a component of the UE 350 and may include the memory 360 and/or at least one of the TX processor 368, the RX processor 356, and the controller/processor 359. In one configuration, the apparatus 1902 may be a modem chip and include just the baseband processor 1904, and in another configuration, the apparatus 1902 may be the entire UE (e.g., see 350 of FIG. 3) and include the aforediscussed additional modules of the apparatus 1902.

The communication manager 1932 includes a component 1940 that is configured to transmit data to and receiving from a first network entity through a second UE, e.g., as described in connection with 1802 of FIG. 18. The communication manager 1932 further includes a component 1942 that is configured to receive a configuration for establishing one or more DAPS RLC channels on the first network entity, e.g., as described in connection with 1804 of FIG. 18. The communication manager 1932 further includes a component 1944 that is configured to receive a handover message, wherein the handover message comprises a configuration for connecting to a second network entity, e.g., as described in connection with 1806 of FIG. 18. The communication manager 1932 further includes a component 1946 that is configured to establish a connection with the second network entity based at least in part on the configuration for connecting to the second network entity, e.g., as described in connection with 1810 of FIG. 18.

The apparatus may include additional components that perform each of the blocks of the algorithm in the aforementioned flowcharts of FIG. 18. As such, each block in the aforementioned flowcharts of FIG. 18 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof. In one configuration, the apparatus 1902, and in particular the cellular baseband processor 1904, includes means for transmitting data to and receiving from a first network entity through a second UE; means for receiving a configuration for establishing one or more DAPS RLC channels on the first base station; means for receiving a handover message, wherein the handover message comprises a configuration for connecting to a second base station; and means for establishing a connection with the second network entity based at least in part on the configuration for connecting to the second network entity. The aforementioned means may be one or more of the aforementioned components of the apparatus 1902 configured to perform the functions recited by the aforementioned means. As described supra, the apparatus 1902 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 20:
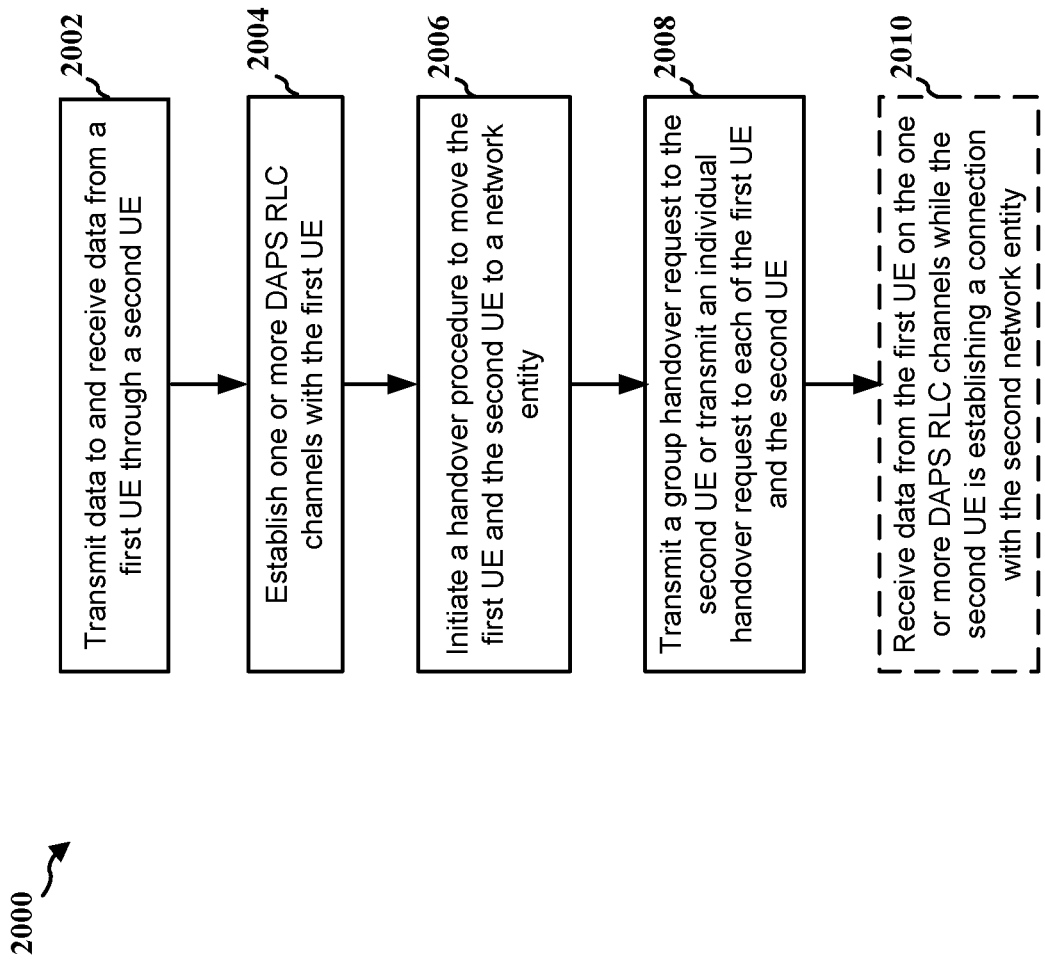
FIG. 20 is a flowchart of a method of wireless communication.

FIG. 20 is a flowchart 2000 of a method of wireless communication. The method may be performed by a first network entity (e.g., a source base station) or a component of a network entity (e.g., network entity 102, 180, 310, 404, 1104, 1504; which may include the memory 376 and which may be the entire network entity 310 or a component of the network entity 310, such as the TX processor 316, the RX processor 370, and/or the controller/processor 375). Optional aspects are illustrated with a dashed line. The method may enable the first network entity to receive data from a first UE (e.g., the remote UE 104, 502, 503, 1102, 1502) through a second UE (e.g., the relay UE 106, 406, 506, 1106, 1506) while the second UE is moving to a second network entity (e.g., the target network entity 1105, 1505).

At 2002, the first network entity may transmit data to and receiving data from a first UE through a second UE, such as described in connection with FIGS. 5, 11-15.

At 2004, the first network entity may establish one or more DAPS RLC channels with the first UE, such as described in connection with FIGS. 12 and 14.

At 2006, the first network entity may initiate a handover procedure to move the first UE and the second UE to a second network entity, such as described in connection with FIGS. 11-15. For example, the first base statin may receive one or more measurement report from the second UE or both the first UE and the second UE. The first network entity may initiate the handover procedure based at least in part on the one or more measurement report. Then, the first network entity may transmit a handover preparation message to the second network entity, such as described in connection with FIGS. 11, 13 and 15.

At 2008, the first network entity may transmit a group handover request to the second UE or transmitting an individual handover request to each of the first UE and the second UE, such as described in connection with FIGS. 11-15. If the first network entity is transmitting a group handover request to the second UE, the group handover request may comprise a handover message for the first UE, such as in a message container. In one example, the handover message may comprise a RRC reconfiguration for the first UE, and the first UE may establish a connection with the second network entity based at least in part on the RRC reconfiguration for the first UE.

At 2010, the first network entity may receive data from the first UE on the one or more DAPS RLC channels while the second UE is establishing a connection with the second network entity, such as described in connection with FIGS. 12 and 14. The network entity may also receive data from the first UE on one or more non-DAPS RLC channels if the second UE fails to establish a connection with the second network entity.

Figure 21:
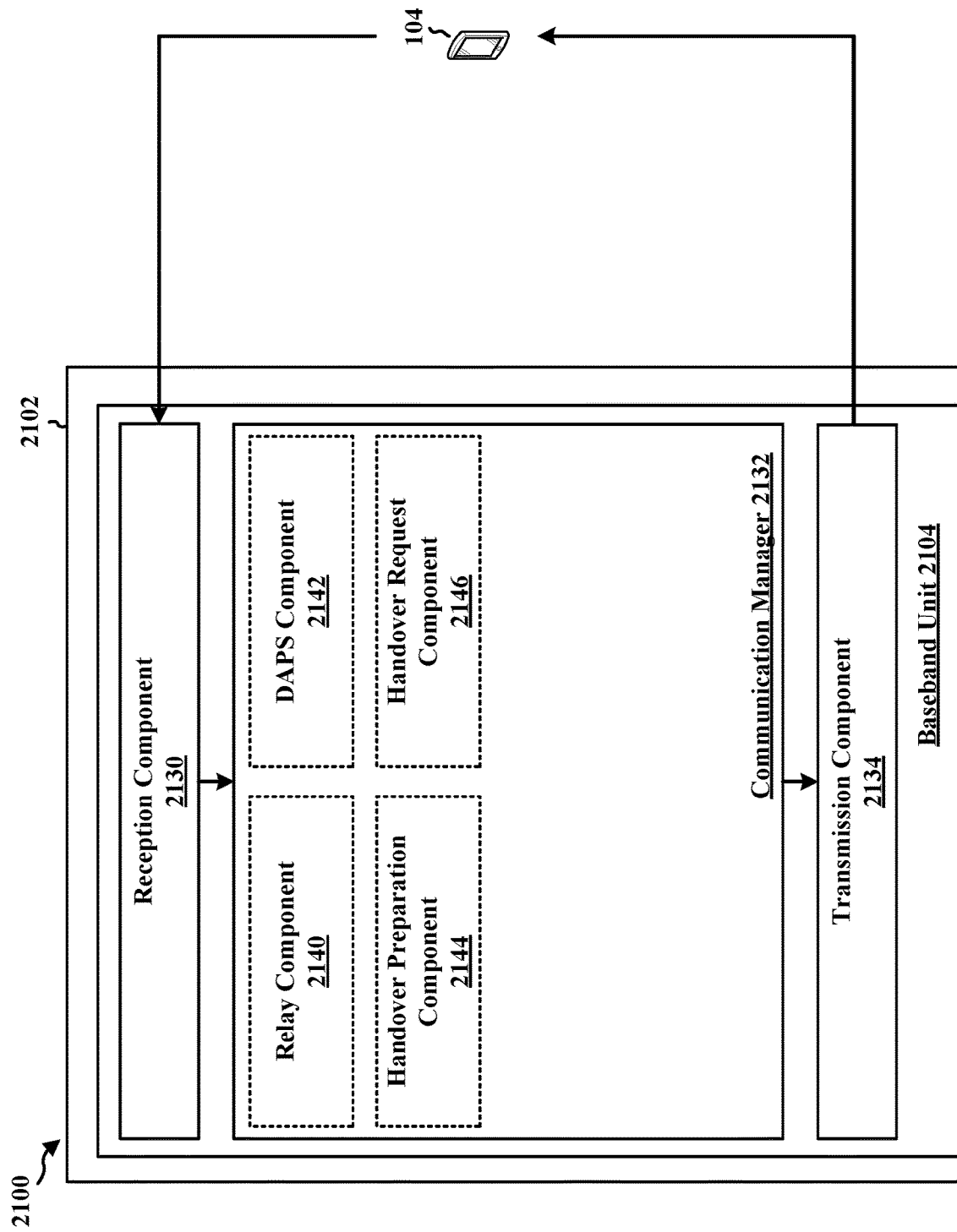
FIG. 21 is a diagram illustrating an example of a hardware implementation for an example apparatus according to some aspects.

FIG. 21 is a diagram 2100 illustrating an example of a hardware implementation for an apparatus 2102. The apparatus 2102 is a network entity and includes a baseband unit 2104. The baseband unit 2104 may communicate through a cellular RF transceiver with the UE 104. The baseband unit 2104 may include a computer-readable medium/memory. The baseband unit 2104 is responsible for general processing, including the execution of software stored on the computer-readable medium/memory. The software, when executed by the baseband unit 2104, causes the baseband unit 2104 to perform the various functions described supra. The computer-readable medium/memory may also be used for storing data that is manipulated by the baseband unit 2104 when executing software. The baseband unit 2104 further includes a reception component 2130, a communication manager 2132, and a transmission component 2134. The communication manager 2132 includes the one or more illustrated components. The components within the communication manager 2132 may be stored in the computer-readable medium/memory and/or configured as hardware within the baseband unit 2104. The baseband unit 2104 may be a component of the network entity 310 and may include the memory 376 and/or at least one of the TX processor 316, the RX processor 370, and the controller/processor 375.

The communication manager 2132 includes a component 2140 that is configured to transmit data to and receiving data from a first UE through a second UE, e.g., as described in connection with 2002 of FIG. 20. The communication manager 2132 further includes a component 2142 that is configured to establish one or more DAPS RLC channels with the first UE, e.g., as described in connection with 2004 of FIG. 20. The communication manager 2132 further includes a component 2144 that is configured to initiate a handover procedure to move the first UE and the second UE to a second network entity, e.g., as described in connection with 2006 of FIG. 20. The communication manager 2132 further includes a component 2146 that is configured to transmit a group handover request to the second UE or transmitting an individual handover request to each of the first UE and the second UE, e.g., as described in connection with 2008 of FIG. 20.

The apparatus may include additional components that perform each of the blocks of the algorithm in the aforementioned flowcharts of FIG. 20. As such, each block in the aforementioned flowcharts of FIG. 20 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof. In one configuration, the apparatus 2102, and in particular the baseband unit 2104, includes means for transmitting data to and receiving data from a first UE through a second UE; means for establish one or more DAPS RLC channels with the first UE; means for initiating a handover procedure to move the first UE and the second UE to a second base station; and means for transmitting a group handover request to the second UE or transmitting an individual handover request to each of the first UE and the second UE. The aforementioned means may be one or more of the aforementioned components of the apparatus 2102 configured to perform the functions recited by the aforementioned means. As described supra, the apparatus 2102 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

The following examples set forth additional aspects and are illustrative only and may be combined with aspects of other embodiments or teachings described herein, without limitation.

Aspect 1 is a method of wireless communication at a relay user equipment (UE) that includes relaying data between a first network entity and at least one remote UE based on a first configuration of the at least one remote UE; receiving, from the first network entity on a first connection, a handover request that includes one or more of a second configuration for a second network entity or a third configuration for the at least one remote UE; determining whether one or more dual active protocol stack (DAPS) radio link control (RLC) channels are configured for the at least one remote UE based on the first configuration or the third configuration; establishing a second connection with the second network entity based at least in part on the second configuration; and transmitting, to the at least one remote UE, a handover status indication indicating a result of establishing the second connection with the second network entity.

In Aspect 2, the method of Aspect 1 further includes relaying, to the at least one remote UE, the handover request when the one or more DAPS RLC channels are configured for the at least one remote UE.

In Aspect 3, the method of Aspect 1 or Aspect 2 further includes determining that the one or more DAPS RLC channels and one or more non-DAPS RLC channels are configured for the at least one remote UE; and relaying, to the at least one remote UE, the handover request.

In Aspect 4, the method of any of Aspects 1-3 further includes determining that no non-DAPS RLC channels are configured for the at least one remote UE; and relaying, to the at least one remote UE, the handover request when the second connection with the second network entity is successfully established and there are no non-DAPS RLC channels configured for the at least one remote UE.

In Aspect 5, the method of any of Aspects 1-4 further includes that the handover request further comprises a handover message for the at least one remote UE.

In Aspect 6, the method of any of Aspects 1-5 further includes that the handover message comprises a radio access radio resource control (RRC) reconfiguration message for the at least one remote UE to establish a connection between the at least one remote UE and the second network entity.

In Aspect 7, the method of any of Aspects 1-5 further includes relaying the handover message to the at least one remote UE over sidelink RLC channels for signaling radio bearers of the at least one remote UE.

In Aspect 8, the method of any of Aspects 1-5 further includes that the handover message is transmitted to the at least one remote UE over sidelink.

In Aspect 9, the method of any of Aspects 1-5 further includes that the handover message is transmitted in a unicast transmission or a groupcast transmission.

In Aspect 10, the method of Aspect 9 further includes that the groupcast transmission comprises a group destination identification (ID) generated based at least in part on an association between the relay UE and the at least one remote UE.

In Aspect 11, the method of any of Aspects 1-10 further includes relaying data for the at least one remote UE using the one or more DAPS RLC channels on the first connection to the first network entity while establishing the second connection with the second network entity when the one or more DAPS RLC channels are configured for the at least one remote UE.

In Aspect 12, the method of any of Aspects 1-11 further includes determining a link failure for the second connection with the second network entity; and initiating a reestablishment procedure.

In Aspect 13, the method of Aspect 12 further includes releasing or suspending a link between the relay UE and the at least one remote UE.

In Aspect 14, the method of Aspect 12 further includes transmitting, to the at least one remote UE, a discovery message indicating temporary unavailability of relaying support or discontinued relaying support for the at least one remote UE.

In Aspect 15, the method of Aspect 14 further includes resuming a suspended link between the relay UE and the at least one remote UE; and transmitting, to the at least one remote UE, a message that advertises relay support for the at least one remote UE based on a relay advertisement criteria after the relay UE completes the reestablishment procedure successfully.

In Aspect 16, the method of Aspect 12 further includes maintaining the first connection with the first network entity based on the link failure when the one or more DAPS RLC channels are configured for the at least one remote UE; sending a handover failure notification to the at least one remote UE; and resuming relaying over one or more non-DAPS RLC channels on the first connection for the at least one remote UE.

In Aspect 17, the method of Aspect 16 further includes releasing a handover message received from the first network entity for the at least one remote UE.

Aspect 18 is a device including one or more processors and one or more memories in electronic communication with the one or more processors storing instructions executable by the one or more processors to cause a system or an apparatus to implement a method as in any of Aspects 1 to 17.

Aspect 19 is a system or an apparatus including means for implementing a method or realizing an apparatus as in any of Aspects 1 to 17.

Aspect 20 is a non-transitory computer-readable medium storing instructions executable by one or more processors to cause the one or more processors to implement a method as in any of Aspects 1 to 17.

Aspect 21 is a method of wireless communication at a remote user equipment (UE) that includes communicating data with a first network entity on a first connection through a relay UE; receiving a first configuration for establishing one or more dual active protocol stack (DAPS) radio link control (RLC) channels; receiving a handover message that includes a second configuration for connecting the remote UE to a second network entity; and establishing a second connection with the second network entity based at least in part on the second configuration.

In Aspect 22, the method of Aspect 21 further includes determining from the handover message whether the remote UE is to perform a handover to the second network entity via the relay UE or another UE based at least in part on a relay UE identifier in the handover message or an explicit indication of relay UE change in the handover message.

In Aspect 22, the method of Aspect 21 further includes transmitting, to the first network entity on the one or more DAPS RLC channels, data while the relay UE is establishing a connection with the second network entity.

In Aspect 23, the method of Aspect 21 or Aspect 22 further includes suspending a data transmission to the first network entity on one or more non-DAPS RLC channels while the relay UE is establishing a connection with the second network entity.

In Aspect 24, the method of any of Aspects 21-23 further includes receiving a handover status indication from the relay UE indicating whether the relay UE has established a connection with the second network entity.

In Aspect 25, the method of Aspect 24 further includes determining that one or more non-DAPS RLC channels are configured for the remote UE; and refraining from establishing the second connection with the second network entity prior to receiving the handover status indication from the relay UE.

In Aspect 26, the method of any of Aspects 21-25 further includes communicating, with the second network entity through the relay UE, data on the one or more DAPS RLC channels after the second connection with the second network entity is established.

In Aspect 27, the method of any of Aspects 21-26 further includes determining that no non-DAPS RLC channels are configured for the remote UE, wherein the establishing the second connection comprises establishing the second connection with the second network entity upon receiving the handover message when there are no non-DAPS RLC channels configured for the remote UE.

In Aspect 28, the method of any of Aspects 21-27 further includes receiving a handover failure notification from the relay UE; and determining to discontinue data transmission to the relay UE or release a link between the remote UE and the relay UE based on the handover failure notification.

In Aspect 29, the method of any of Aspects 21-28 further includes receiving a handover failure notification from the relay UE; releasing the second configuration for connecting to the second network entity; and resuming data transmission using one or more non-DAPS dedicated radio bearers on the first network entity.

Aspect 30 is a device including one or more processors and one or more memories in electronic communication with the one or more processors storing instructions executable by the one or more processors to cause a system or an apparatus to implement a method as in any of Aspects 21 to 29.

Aspect 31 is a system or an apparatus including means for implementing a method or realizing an apparatus as in any of Aspects 21 to 29.

Aspect 32 is a non-transitory computer-readable medium storing instructions executable by one or more processors to cause the one or more processors to implement a method as in any of Aspects 21 to 29.

Aspect 33 is a method of wireless communication at a first network entity, comprises: transmitting data to and receiving data from a first UE through a second UE; establishing one or more DAPS RLC channels with the first UE; initiating a handover procedure to move the first UE and the second UE to a second network entity; and transmitting a group handover request to the second UE or transmitting an individual handover request to each of the first UE and the second UE.

In Aspect 34, the method of Aspect 33 further comprises: receiving one or more measurement report from the second UE or both the first UE and the second UE; and initiating the handover procedure based at least in part on the one or more measurement report.

In Aspect 35, the method of Aspect 33 or Aspect 34 further comprises: transmitting a handover preparation message to the second network entity.

In Aspect 36, the method of any of Aspects 33-35 further includes that the group handover request comprises a handover message for the first UE.

In Aspect 37, the method of any of Aspects 33-36 further includes that the handover message comprises a RRC reconfiguration for the first UE, and the first UE establishes a connection with the second network entity based at least in part on the RRC reconfiguration for the first UE.

In Aspect 38, the method of any of Aspects 33-37 further comprises: receiving data from the first UE on the one or more DAPS RLC channels while the second UE is establishing a connection with the second network entity.

In Aspect 39, the method of any of Aspects 33-38 further comprises: receiving data from the first UE on one or more non-DAPS RLC channels if the second UE fails to establish a connection with the second network entity.

Aspect 40 is a device including one or more processors and one or more memories in electronic communication with the one or more processors storing instructions executable by the one or more processors to cause a system or an apparatus to implement a method as in any of Aspects 33 to 39.

Aspect 41 is a system or an apparatus including means for implementing a method or realizing an apparatus as in any of Aspects 33 to 39.

Aspect 42 is a non-transitory computer-readable medium storing instructions executable by one or more processors to cause the one or more processors to implement a method as in any of Aspects 33 to 39.

Aspect 43 is a method of wireless communication at a first network entity that includes receiving one or more measurement reports from one or more of a relay user equipment (UE) or a remote UE through the relay UE; transmitting, to the relay UE, a first configuration for establishing one or more dual active protocol stack (DAPS) radio link control (RLC) channels; determining to initiate a group handover procedure with a second network entity based on the one or more measurement reports; communicating, with the second network entity over a backhaul connection, one or more handover preparation messages for the relay UE and the remote UE; and transmitting, to one or more of the relay UE or the remote UE, a group handover command that includes a second configuration for connecting the remote UE to the second network entity.

In Aspect 44, the method of Aspect 43 further includes receiving, from the remote UE over one or more DAPS RLC channels, data while the relay UE is establishing a connection to the second network entity.

Aspect 45 is a device including one or more processors and one or more memories in electronic communication with the one or more processors storing instructions executable by the one or more processors to cause a system or an apparatus to implement a method as in any of Aspects 43 to 44.

Aspect 46 is a system or an apparatus including means for implementing a method or realizing an apparatus as in any of Aspects 43 to 44.

Aspect 47 is a non-transitory computer-readable medium storing instructions executable by one or more processors to cause the one or more processors to implement a method as in any of Aspects 43 to 44.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if" "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication at a relay user equipment (UE), comprising:
   relaying data between a first network entity and at least one remote UE based on a first configuration of the at least one remote UE;
   receiving, from the first network entity on a first connection, a handover request that includes one or more of a second configuration for a second network entity or a third configuration for the at least one remote UE;
   determining whether one or more dual active protocol stack (DAPS) radio link control (RLC) channels are configured for the at least one remote UE based on the first configuration or the third configuration;
   establishing a second connection with the second network entity based at least in part on the second configuration; and
   transmitting, to the at least one remote UE, a handover status indication indicating a result of establishing the second connection with the second network entity.

2. The method of claim 1, further comprising:
   determining that the one or more DAPS RLC channels and one or more non-DAPS RLC channels are configured for the at least one remote UE; and
   relaying, to the at least one remote UE, the handover request.

3. The method of claim 1, further comprising:
   determining that no non-DAPS RLC channels are configured for the at least one remote UE; and
   relaying, to the at least one remote UE, the handover request when the second connection with the second network entity is successfully established.

4. The method of claim 1, wherein the handover request further comprises a handover message for the at least one remote UE.

5. The method of claim 4, wherein the handover message comprises a radio access radio resource control (RRC) reconfiguration message for the at least one remote UE to establish a connection between the at least one remote UE and the second network entity.

6. The method of claim 4, further comprising relaying the handover message to the at least one remote UE over sidelink RLC channels for signaling radio bearers of the at least one remote UE.

7. The method of claim 4, wherein the handover message is transmitted in a unicast transmission or a groupcast transmission.

8. The method of claim 7, wherein the groupcast transmission comprises a group destination identification (ID) generated based at least in part on an association between the relay UE and the at least one remote UE.

9. The method of claim 1, further comprising relaying data for the at least one remote UE using the one or more DAPS RLC channels on the first connection to the first network entity while establishing the second connection with the second network entity when the one or more DAPS RLC channels are configured for the at least one remote UE.

10. The method of claim 1, further comprising:
   determining a link failure for the second connection with the second network entity; and
   initiating a reestablishment procedure.

11. The method of claim 10, further comprising releasing or suspending a link between the relay UE and the at least one remote UE.

12. The method of claim 10, further comprising transmitting, to the at least one remote UE, a discovery message indicating temporary unavailability of relaying support or discontinued relaying support for the at least one remote UE.

13. The method of claim 12, further comprising:
   resuming a suspended link between the relay UE and the at least one remote UE; and
   transmitting, to the at least one remote UE, a message that advertises relay support for the at least one remote UE based on a relay advertisement criteria after the relay UE completes the reestablishment procedure successfully.

14. The method of claim 10, further comprising:
   maintaining the first connection with the first network entity based on the link failure when the one or more DAPS RLC channels are configured for the at least one remote UE;
   sending a handover failure notification to the at least one remote UE;

resuming relaying over one or more non-DAPS RLC channels on the first connection for the at least one remote UE; and releasing a handover message received from the first network entity for the at least one remote UE.

15. An apparatus for wireless communication at a relay user equipment (UE), comprising:

a memory;

a transceiver; and at least one processor coupled to the memory and the transceiver, the at least one processor configured to:

relay data between a first network entity and at least one remote UE, via the transceiver, based on a first configuration of the at least one remote UE;

receive, from the first network entity on a first connection, via the transceiver, a handover request that includes one or more of a second configuration for a second network entity or a third configuration for the at least one remote UE;

determine whether one or more dual active protocol stack (DAPS) radio link control (RLC) channels are configured for the at least one remote UE based on the first configuration or the third configuration;

establish a second connection with the second network entity based at least in part on the second configuration; and transmit, to the at least one remote UE, via the transceiver, a handover status indication indicating a result of establishing the second connection with the second network entity.

16. The apparatus of claim 15, wherein the at least one processor is further configured to relay, to the at least one remote UE, via the transceiver, the handover request when the one or more DAPS RLC channels are configured for the at least one remote UE.

* * * * *